(12) United States Patent
Ferroni

(10) Patent No.: US 11,495,022 B2
(45) Date of Patent: Nov. 8, 2022

(54) METHOD FOR RECOGNIZING AN OBJECT OF A MOBILE UNIT

(71) Applicant: SIEMENS MOBILITY GMBH, Munich (DE)

(72) Inventor: Francesco Ferroni, Munich (DE)

(73) Assignee: Siemens Mobility GmbH, Munich (DE)

( * ) Notice: Subject to any disclaimer, the term of this patent is extended or adjusted under 35 U.S.C. 154(b) by 290 days.

(21) Appl. No.: 16/500,888

(22) PCT Filed: Apr. 3, 2018

(86) PCT No.: PCT/EP2018/058452
§ 371 (c)(1),
(2) Date: Oct. 4, 2019

(87) PCT Pub. No.: WO2018/185081
PCT Pub. Date: Oct. 11, 2018

(65) Prior Publication Data
US 2020/0034626 A1 Jan. 30, 2020

(30) Foreign Application Priority Data

Apr. 4, 2017 (EP) .................................... 17164800

(51) Int. Cl.
*G06V 20/00* (2022.01)
*G06N 20/00* (2019.01)
(Continued)

(52) U.S. Cl.
CPC ............. *G06V 20/35* (2022.01); *G06F 17/18* (2013.01); *G06K 9/6228* (2013.01);
(Continued)

(58) Field of Classification Search
CPC ............. G06K 9/00684; G06K 9/6228; G06K 9/6267; G06K 2209/19; G06N 20/00; G06F 17/18; G06T 7/0002; G06T 2207/30248
See application file for complete search history.

(56) References Cited

U.S. PATENT DOCUMENTS 4,589,140 A 5/1986 Bishop et al.
9,786,042 B2 10/2017 Venkatesha et al.
(Continued)

FOREIGN PATENT DOCUMENTS

EP 3051250 A1 8/2016
WO 8403784 A1 9/1984
WO 2015193903 A2 12/2015

OTHER PUBLICATIONS

Schlake, B.W., Todorovic, S., Edwards, J.R., Hart, J.M., Ahuja, N. and Barkan, C.P., 2010. Machine vision condition monitoring of heavy-axle load railcar structural underframe components. Proceedings of the Institution of Mechanical Engineers, Part F: Journal of Rail and Rapid Transit, 224(5), pp. 499-511.*
(Continued)

*Primary Examiner* — Zhitong Chen
(74) *Attorney, Agent, or Firm* — Laurence Greenberg; Werner Stemer; Ralph Locher

(57) ABSTRACT

A method recognizes an object of a mobile unit in a digital image that shows at least one partition of the mobile unit, especially in motion, by using a method for machine learning. To provide an accurate and reliable recognition the method includes using machine learning in a categorization step for categorizing the digital image, which shows the partition of the mobile unit, with a category. By using the machine learning in a detection step the object of the mobile unit in the categorized digital image and a location of the object in the categorized digital image are determined. By
(Continued)

using machine learning in a segmentation step positions in the categorized digital image are classified such that it is determined whether at a respective position of the categorized digital image a part of the object is present or not.

26 Claims, 14 Drawing Sheets

(51) Int. Cl.
*G06F 17/18* (2006.01)
*G06K 9/62* (2022.01)
*G06T 7/00* (2017.01)

(52) U.S. Cl.
CPC ........... *G06K 9/6267* (2013.01); *G06N 20/00* (2019.01); *G06T 7/0002* (2013.01); *G06T 2207/30248* (2013.01)

(56) References Cited

U.S. PATENT DOCUMENTS

| | | |
|---|---|---|
| 2009/0290757 A1 | 11/2009 | Mian et al. |
| 2010/0100275 A1* | 4/2010 | Mian .................. B61L 1/20 |
| | | 701/31.4 |
| 2016/0275079 A1 | 9/2016 | Kluckner et al. |
| 2017/0124784 A1 | 5/2017 | Wittmann et al. |
| 2018/0300576 A1* | 10/2018 | Dalyac ................. G06K 9/6218 |

OTHER PUBLICATIONS

Marino, F., Distante, A., Mazzeo, P.L. and Stella, E., 2007. A real-time visual inspection system for railway maintenance: automatic hexagonal-headed bolts detection. IEEE Transactions on Systems, Man, and Cybernetics, Part C (Applications and Reviews), 37(3), pp. 418-428.*

* cited by examiner

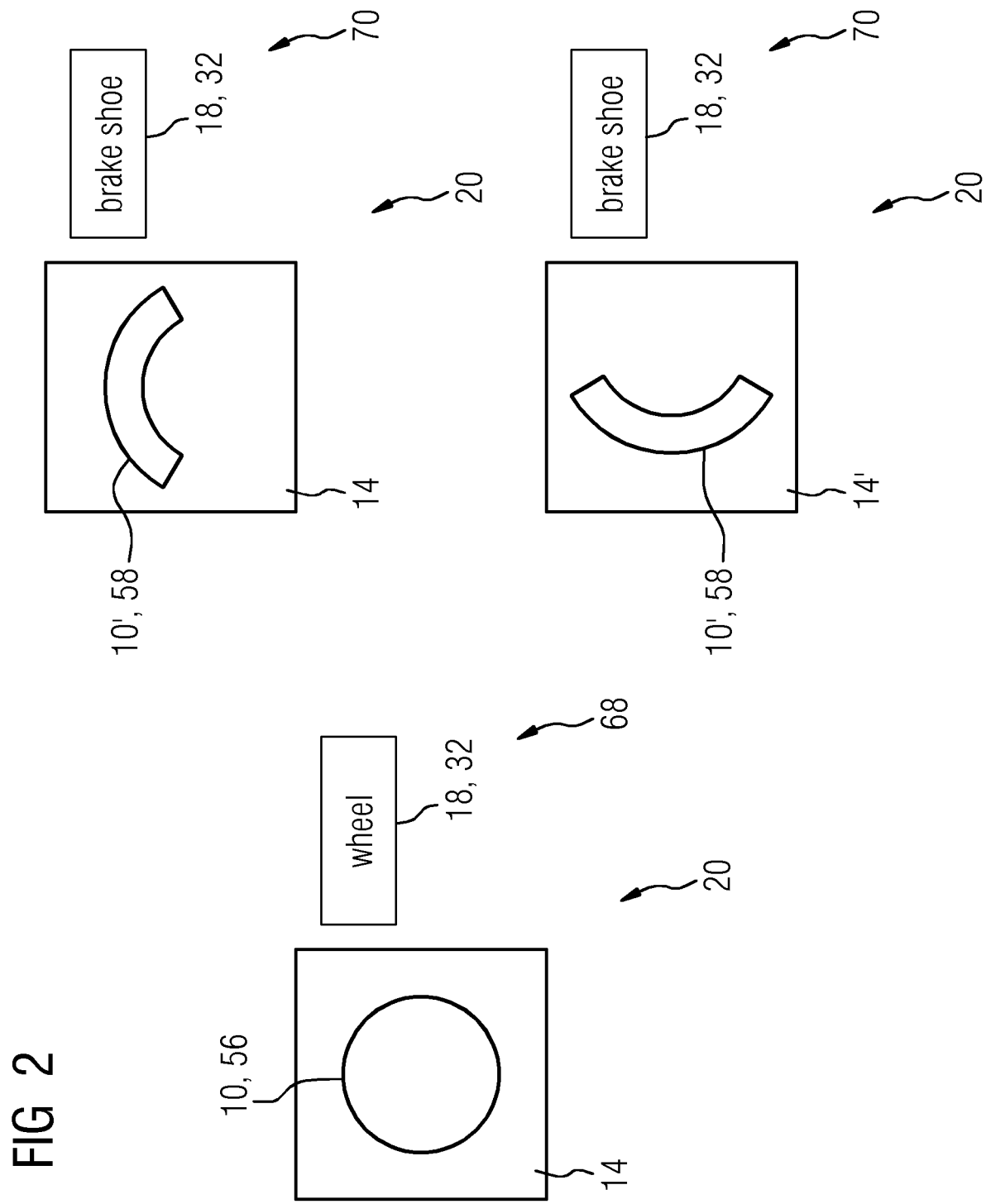

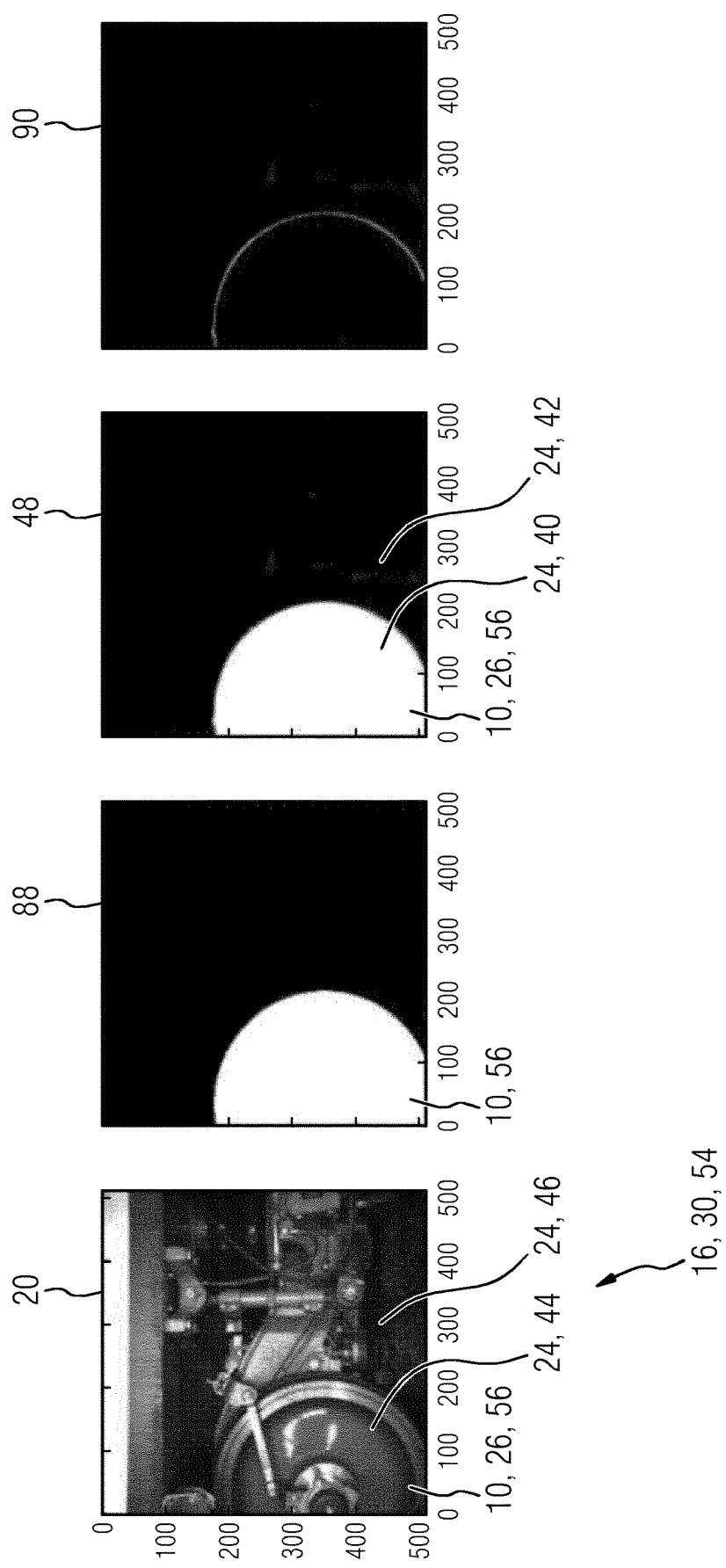

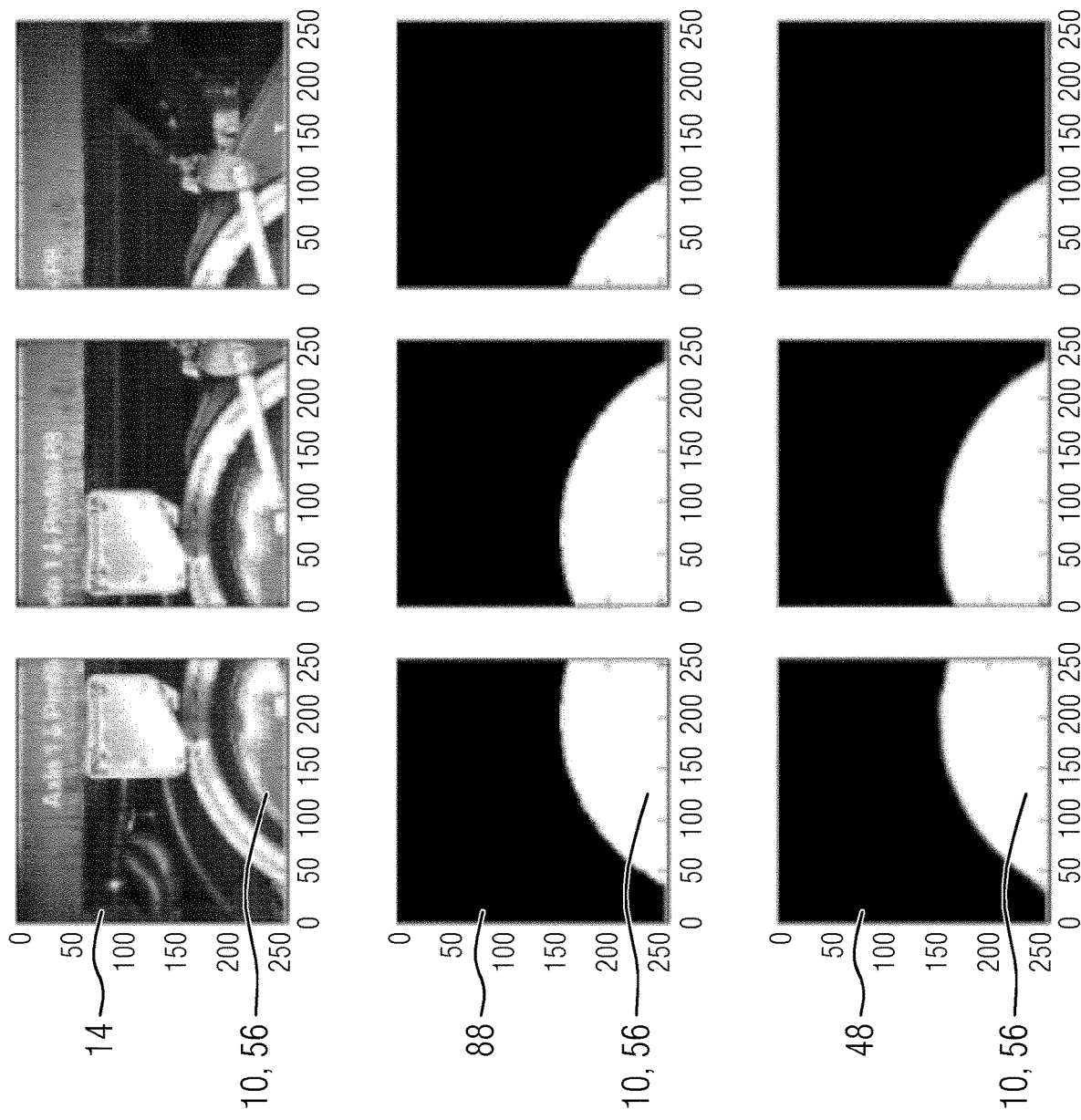

(E)

(D)

METHOD FOR RECOGNIZING AN OBJECT OF A MOBILE UNIT

BACKGROUND OF THE INVENTION

Field of the Invention

The present invention relates to a method for recognising at least one object of a mobile unit in a digital image by using a method for machine learning and to such a method for machine learning. The present invention further relates to uses and to an execution of such a recognition method. Moreover, the present invention further relates to a recognition system for recognising the object of the mobile unit, to a computer program and to a computer-readable storage medium.

Modern trains operating in modern railway systems are subjected to challenging demands like traveling with high speed, over long durations and distances as well as having a long service life. Hence, the train and its components need to withstand all kinds of operating conditions like frequent changes of speed e.g. due to stopping or passing a railway station, train stops at stop signs, speed limits e.g. at bridges or tunnels, weather and thus temperature changes. Thus, supervising the train and especially stressed components of the train is essential to ensure a secure operation of the railway system.

It is known to monitor and measure the train components by using a laser system. This system also takes pictures while the train is in motion, but it simply stores them for later reference, in case the laser system raises an alarm or warning regarding a particular component at a certain position along the train. In case of a warning, an engineer would manually review the image associated with the measurement/laser measurement. The engineer would decide whether the measurement is correct or incorrect and whether the image it-self is correct or not. For example, the engineer was expecting a brake pad. The picture does not show a brake pad, but rather 30 cm after the brake pad. Thus, the engineer can conclude that the train was moving too fast and the system measured a location too late to hit the component of interest. The laser of such a laser system requires careful calibration for a specific type of train. Further, they are error prone in case of suboptimal circumstances due to specific weather conditions, for example, contamination of components with mud etc. Moreover, in case of a warning man power is needed to check the system output.

SUMMARY OF THE INVENTION

It is a first objective of the invention to provide a method for recognising at least one object of a mobile unit with which the above-mentioned shortcomings can be mitigated, and especially, to provide a method that is more flexible, less strict on optimal calibration and independent from man power as the system known from the prior art.

Further, it is a second object of the invention to provide an application of the method that is independent from exact calibration, perspective or lighting.

Moreover, it is a third, fourth and fifth objective of the present invention to provide advantageous uses of the method for recognising at least one object of a mobile unit.

Furthermore, it is a sixth objective of the present invention to provide a method for training the method for machine learning of the recognition method that allows a quick and independent execution of the recognition method.

It is a seventh objective of the present invention to provide a recognition system with which a processing and editing of the digital image can be advantageously facilitated.

In addition, it is a seventh and eighth objective of the present invention to provide a computer program and a computer-readable storage medium to allow a computer to advantageously carry out the steps of the recognition method.

SUMMARY OF THE INVENTION

Accordingly, the present invention provides a method for recognising at least one object of a mobile unit in a digital image that shows at least one partition of the mobile unit, especially in motion, by using a method for machine learning.

It is provided that the method comprises at least the following step(s):

Categorising by using the machine learning in a categorisation step the digital image, which shows the partition of the mobile unit, with a category Determining by using the machine learning in a detection step at least one object of the mobile unit in the categorised digital image and a location of the at least one object in the categorised digital image and/or Classifying by using the machine learning in a segmentation step positions in the categorised digital image in such that it is determined whether at a respective position of the categorised digital image a part of the at least one object is present or not.

Due to the inventive method the recognition can be performed automatically and thus saving time and man power. Further, by using exclusively a digital image the method is more flexible, less strict on optimal calibration, less prone perspectine or lighting in comparison with state of the art systems. Moreover, expensive recognition systems e.g. based on laser technique can be omitted advantageously saving costs. Even if such systems may be employed the recognition method based on the digital image may be used to check and verify the state of the art system.

Even if a term like object, partition, component assembly, parameter, visual description property, abnormality, warning, criterion and measurement system is used in the singular or in a specific numeral form in the claims and the specification the scope of the patent (application) should not be restricted to the singular or the specific numeral form. It should also lie in the scope of the invention to have more than one or a plurality of the above mentioned structure(s). Moreover, explanations given in the introduction concerning structures or systems in the railway field should also apply for the structures or systems mentioned in reference to the invention.

In principle, the first, second and third step (categorisation step, detection step and segmentation step) can be performed individually with specialized networks. Specifically, either the first and second step (categorisation step and detection step) or the first and third step (categorising step and segmentation step) were performed in sequence. However, it may be especially advantageous when all three steps (categorisation step, detection step and segmentation step) may be performed in sequence to one another. By having these steps in a pipeline, a reliability, especially with smaller data sets, can be improved. In fact, with infinite data, an "end-to-end" trained network with multiple outputs may be had, such as classification, segmentation and detection which could share weights of parts of this big network.

Advantageously, the output of the detection step can be used for the segmentation step. For example, this provides the ability to "zoom-in" to a particular area using the detection output. Hence, by using the detection step before segmentation step only the area of location of the object may be segmented or even a higher resolution image for this location/patch may be used. This may introduce less variance in the image, especially if the object/component is quite standardized. Higher resolution images yield better segmentation results.

An object of the mobile unit is intended to mean any part, component of the mobile unit or of its sub-units feasible for a person skilled in the art that needs to be checked or supervised, especially, during operation that is during travel of the unit. Preferably, the object may be a bogie component and especially a wheel, a brake shoe, a brake pad, a spring, a screw, a tag, a number.

The mobile unit might be any unit, especially constructed unit, like a motor vehicle (car, motor cycle, bicycle, van, lorry, bus, train) that can be moved, especially by human manipulation. Preferably, it may be a track-bound vehicle. A track-bound vehicle is intended to mean any vehicle feasible for a person skilled in the art, which is, due to a physical interaction with a track, especially a pre-determined track, restricted to this track or path. A physical interaction/connection should be understood as a form fit connection, an electrical connection or a magnetic connection. The physical connection might be releasable. In this context a "pre-determined track" is intended to mean a beforehand existing, human-built track or path comprising selected means building or forming the track, like a rail or a cable. The pre-determined track may be also referred to as track in the following text. Preferably, the pre-determined track is a railway track, like the UK mainline railway.

The vehicle may be a train, an underground railway, a tram or a trolley bus. Preferably, the track-bound vehicle may be a train. Hence, the method can be employed where several vehicles are traveling the same track. Advantageously, the track-bound vehicle or the train may be a high speed train. Thus, the method can be used for a network in which a high level of security is essential and needed. The unit or the track-bound vehicle may be also referred to as vehicle or train in the following text. The method is preferably executed when the mobile unit is in motion. Additionally to the motion of the unit/vehicle the object can make an additional motion, like a rotation (wheel) a vertical movement e.g. due to a compression (spring) or a horizontal movement (components of a brake).

A partition of the mobile unit is intended to mean a sub-part of the unit, like a carriage, a tail, a front, a roof, an undercarriage.

The digital image may originate from any source feasible for a person skilled in the art, like a camera, a high resolution camera, an ultra sound device or an IR device. Advantageously, detailed images can be obtained when the digital image is an image taken from a high resolution camera. The source may be positioned on the unit. However, a more advantageous approach can be provided when the source or camera, respectively, is positioned at a non-unit-borne (non-vehicle-borne) location. Thus, the source is positioned or moving independently from the vehicle. The source or camera may be positioned on a flying drone or preferably at a stationary device positioned at the track of the unit or on the landside and thus being a track-borne device. A track-borne device is intended to mean a device associated or being in spatial and/or physical connection with a track, like a railway track. Moreover, the track-borne device is embodied in such a way to monitor or supervise the vehicle while passing a selected location or point of the track. Hence, the image may be taken while the mobile unit passes the high resolution camera positioned at the track. Since the track is frequented by several trains the same device or camera can be advantageously used to recognise objects on different units (trains).

Since the method is less prone to exact calibration, perspective and lighting in comparison with state of the art systems it can also be implemented on a mobile device, like a cell phone with a camera. Hence, the present invention also refers to an executing of the recognition method on a mobile device, especially a cell phone with at least one camera. Due to this a flexible and quick survey of objects can be performed. This may be even done by a service person equipped with a mobile device at a railway station.

Moreover, the method for machine learning may be any method feasible for a person skilled in the art. Preferably, it may be a method selected out of the group consisting of: Supervised learning, semi-supervised learning, unsupervised learning, reinforcement learning and active learning. Advantageously, the machine learning follows the principles of supervised learning (details see below).

It is further provided that the method may comprise the further step of allocating in the categorisation step an allocation of the—moving—partition of the mobile unit, which is shown in the digital image, in respect to the mobile unit. Hence, it is determined if the object shown on the digital image fits into the expected category.

Furthermore, the method may comprise the further steps of: Identifying in the categorisation step in the digital image at least one object of the mobile unit and assigning a probability of identification to the at least one identified object. Thus, the quality of the identification can be assessed.

Moreover, the method may comprise the further step of: Performing the categorisation step by assigning a category to the digital image by using the probability of identification of the at least one identified object. Due to this the categorisation can be performed easily.

According to an advantageous embodiment of the invention the method may comprise the further steps of: Performing the categorisation in the categorisation step in case of an identification of several objects and of an assignment of a probability of identification for each identified object of these several identified objects by using all assigned probabilities of identification of all identified objects and assigning in the categorisation step a category to the digital image, wherein the category refers to the identified object with the highest probability of identification. Hence, an emphasis in respect to the identified objects can be made.

Beneficially, the method may comprise the further step of: Selecting the category that is assignable to the digital image out of a predetermined list of categories, wherein the predetermined list of categories represents objects of a component assembly of the mobile unit. Hence, the categorisation can be done easily.

Preferably, the category that is assignable to the digital image may be an object identifier of the object of the mobile unit. An object identified may be any identifier feasible for a person skilled in the art, like a name, a label, a number, a colour, a texture or a more general thing, like "context".

According to a further aspect of the invention the method may comprise the step of: Selecting in the detection step several sub-images in the categorised digital image, wherein a location of each of the selected sub-images in the categorised digital image is defined. Hence, smaller areas of the image can be examined. A sub-image is intended to mean an image that is smaller than the original digital image. The categorised digital image is the digital image from the categorisation step labelled with its referring category or class. The phrase "wherein a location . . . is defined" should be understood in that that the positioning of the sub-image is known or predefined and is, for example, the upper left corner of the image. Preferably, also a size of the sub-image is defined. Further, the plurality of sub-images may add up to the total size of the original digital image. It may be also possible that regions of two or more sub-images overlap.

According to a further realisation of the invention the method may comprise the further step of: Using in the detection step the method of a "sliding window" to select the several sub-images in the categorised digital image. Hence, a thorough partitioning can be performed. In this embodiment there can be a sliding window with an overlap (where, for example, the step/difference/shift is, to the extreme limit, 1 pixel) and the final result is an average of such overlapping subwindows.

Moreover, the method may comprise the further step of: Searching and/or identifying in the detection step in each of the several sub-images the object by which the digital image was categorised in the categorisation step. Due to this each sub-image can also be categorised. This may narrow down areas of examination in possible steps being performed subsequently to this step.

In a further advantageous embodiment of the invention the method may comprise the further step of: Determining in the detection step the location of the object in the categorised digital image by using the defined locations of the sub-images in which the object was recognised. Hence, regions of interest can be narrowed down.

In addition, the method may comprise the further steps of: Marking the identified object in the categorised digital image, especially by a pixel location, a dot, a centroid or a bounding box. Hence, these structures may be employed to identify the location of the object using a ubiquitous marker for all objects simplifying the detection (in case for the identification of one object per image).

In the segmentation step each pixel of the digital image (categorised digital image) or of a sub-image is examined and validated. Using, for example, a single sub-image or a group of sub-images, which show the identified object, for segmentation would advantageously shorten the process. This is so because execution time depends on an input image size.

Hence, according to a further aspect of the invention the method may comprise the step of: Assigning in the segmentation step at least one parameter to each pixel of the categorised digital image, wherein the parameter specifies if a respective pixel represents a part of the identified object or not. Thus, the object can be identified reliably. The parameter may have any information or character feasible for a person skilled in the art, like a colour (e.g. black and white), a validation (e.g. yes or no, right or wrong). A thusly validated classified categorised digital image may be issues as a parameter map, e.g. a black and white pixel image of the digital image.

According to a preferred embodiment of the invention the method may comprise the further step of: Determining at least one visual description property of the identified object by using the classified categorised digital image. Hence, the identified object can be characterised and the result can be used for subsequent steps. A visual description property may be any property of the object feasible for a person skilled in the art, like a size, a contour, a shape, a colour, a texture or a more general thing, like "context" etc.

In a further advantageous embodiment the method may comprise the further step of: Comparing the determined visual description property of the identified object with at least one pre-determined reference visual description property. Hence, the object can be compared to expected criteria and thusly validated. The predetermined properties may be stored for each object in a expectation list.

According to a further aspect of the invention the method may comprise the step of: Detecting at least one abnormality if a predetermined condition is fulfilled or not fulfilled as a result of the comparison. Due to this detection of the discrepancy a security protocol may be established.

Beneficially, the method comprises the further step of: Issuing at least one warning if a predetermined condition is fulfilled or not fulfilled as a result of the comparison. Hence, counter measures can be easily initiated, like recruiting a service crew to inspect the object.

The present invention also refers to a use of the recognition method for an automatic visual inspection of the mobile unit, especially for at least one object of a track-bound vehicle, especially a train, wherein the at least one object of the mobile unit is identified in the digital image during the automatic visual inspection.

Due to the inventive matter the recognition can be performed automatically and thus saving time and man power. Further, by using exclusively a digital image the method is more flexible, less strict on optimal calibration, less prone perspective or lighting in comparison with state of the art systems. Moreover, expensive recognition systems e.g. based on laser technique can be omitted advantageously saving costs. Even if such systems may be employed the recognition method based on the digital image may be used to check and verify the state of the art system.

Visual inspection includes several tasks: First, inspect whether object(s)/component(s) of interest is/are present in a particular image(s) and second, measure these components and decide whether these are within min/max values. As described for the recognition method these tasks require a method and system which is capable of, based exclusively on images:

1. Categorise or classify entire image(s) to belong to specific location(s) (category) in the unit (train). For example, "this image is of a bogie on carriage number 5, left side".
2. Detect the presence of object(s)/component(s) within a single image, giving an approximate pixel location/centroid/bounding box. For example, "In this image, there is a fan in the top left corner and a brake pad in the bottom right."
3. Finally, segmentation capabilities, meaning doing pixel-by-pixel predictions of whether each pixel belongs to a particular object/component, allowing measurements to be performed. For example, "given this image, the model has produced a binary mask where all the "0" pixels do not belong to a wheel, and the "1" pixels belong to a wheel".

The present invention also refers to a use of the recognition method for a recognition of an abnormality in respect to the identified object, wherein the identified object is evaluated by using the categorised digital image or the classified categorised digital image in such that it is determined if the respective image complies or not complies with at least one predefined criterion.

Due to the inventive matter the recognition can be performed automatically and quick. Moreover, a security protocol may be established and executed providing a secure operation.

A predefined criterion may be any criterion feasible for a person skilled in the art, like a size, a contour, a shape, a colour etc. This may also relate to a specific spatial arrangement of a component assembly, wherein the identified object is a part of this assembly.

Due to careful training using data collected and labelled (details see below), the computer algorithm is capable of 1. categorising 2. detecting and 3. segmenting objects or parts purely from one or more frames of images taken from the partition of the mobile unit, e.g. the bogie system, taken while the unit (train) is in motion.

The present invention also refers to a use of the recognition method for checking, and especially for verifying, a result of an alternative method for recognising at least one object of the mobile unit, especially in motion, especially by using an optical measurement system, wherein both methods are executed on the same object.

Due to the inventive matter the recognition method based on the evaluation of the digital image may be used to enhance the security and reliability of the alternative system, like a state of the art laser system. Since both methods are performed they may be used to compare and verify the results from each other. In other words, since the same object is measured with both methods their results can be compared and an issued warning can be confirmed.

Furthermore, the checking, and especially the verifying, is solely performed in case at least one of the methods detects an abnormality. This will save operational time. According to a preferred realisation of the invention the checking, and especially the verifying, is solely performed in case the alternative method detects an abnormality. It may be possible that in case the checking, and especially the verifying, results in a confirmation of an abnormality a warning is issued to an operator.

As stated above, the laser system generates and stores images taken from the measured object. Thus, the system central to this invention would make further use of these stored images by replicating via machine learning what an engineer would normally do in case of the laser system raising a warning: i.e. check if the component is present and whether it was measured correctly.

The present invention also refers to a method for training the method for machine learning of the recognition method.

It is proposed that the training method comprises at least the following steps: Generating of training data that comprise a plurality of training data pairs, wherein each training data pair comprises a training digital image, which shows at least one partition of the mobile unit, especially in motion, and an assigned category and/or an assigned object and/or an assigned location of the identified object and/or an assigned classified categorised digital image and training the method for machine learning by using the training data, wherein at least one parameter of the method for machine learning is adapted.

Due to the inventive method the training can be performed effectively and quickly. Moreover, this method provides a much higher reliability of identification in comparison with state of the art methods.

The assigned object in the categorised digital image and the assigned location of the identified object in the categorised digital are identified in the detection step of the recognition method and the assigned classified categorised digital image is assigned or generated in the segmentation step of the recognition method. Hence, the training method can work with data generated by the recognition method.

Such a training method works by using many labelled examples and an appropriate cost function to optimize over, and by letting the algorithm optimize its internal parameters to minimize the cost function and get a good prediction on the labelled examples (and new unseen examples—aka "generalization"). An example of "supervised" learning would be where the input example is complemented with a "ground-truth" label. For example, if the task is to classify an image into one of three different categories like "wheel", "brake pad", and "spring" a "database" or training set would be made out of the pairs: image of a wheel—example X1-label Y1 "wheel", image of a brake pad—example X2-label Y2 "brake pad" and image of a spring—example Xn-label Yn "spring".

Once the algorithm is trained and the label of a new, unseen image should be predicted, a label is not needed. The label will be generated by the algorithm. This is called "inference".

The machine learning algorithm is preferably an algorithm called deep convolutional neural network.

In a further advantageous embodiment of the invention the digital image of the training data pair may be: a real image of the mobile unit, especially in motion, and/or a synthetic digital image derived from CAD-data of the mobile unit and/or a synthetic digital image derived from a transformation operation of a real image of the mobile unit, especially in motion. Thus, different sources can be used for the training method. A raw image is intended to mean a recorded or collected or crapped image or picture.

The training data pair may, for example, be gathered by manual labelling: A human manually generates labels to match each individual training real image; i.e. for a given picture in a segmentation task, a black/white pixel map of the same size of the input digital image was created as a label to predict the pixels or non-pixels of an object/component of interest.

Another way for gathering training data pairs may be by rendering of CAD assemblies: The components, which should be classified/detected/segmented are known objects or components on e.g. trains. Hence, 3D CAD models of such trains are available. As a result, "synthetic" images and labels can be generated by rendering the 3D assemblies. For rendering some software packages included in the 3D CAD software which make the 3D model look somewhat realistic, or at least have the right "shapes" and textures can be used. From the 3D CAD model, it is obviously possible not just to create the input "image" but also the input "label" in a semi-automatic or fully automatic way.

According to a further realisation of the invention the transformation operation is an operation selected out of the group consisting of: translation, rotation, shearing, filtering, lighting filtering, noising filtering, perspective warping, colour change, change in colour balance, change in contrast, change in lighting. Thus, rather than generating completely new training data pairs, the dataset can be augmented with synthetic images that are originating from the collected images but transformed in some way, i.e. translated slightly in a random direction, rotated slightly in a random angle, flipped upside down, add some random noise, change the colour balance, change the lighting etc.

Depending on the type of label that is needed and the type of transformation that is done, it may or may not be necessary to also apply the same transformation to the label (only to the input digital image). For example, if a classification task is done where the label is simply "wheel", "brake pad", "spring" a change of the label is not needed if any of the transformations listed above is done. In other words, if the image is slightly rotated by +/−10 degrees, it would still have the same label. In other situations, such as in detection or segmentation, the change of the label may be needed depending on the transformation in the data augmentation procedure. In other words, if the original image is translated by 100 pixels to the left, the label pixel map also needs to be translated by 100 pixels to the left. However, if the colour balance is changed in the original image by increasing the strength of the green colours there is no need to apply the transformation to the label.

The present invention also refers to a recognition system for recognising at least one object of a mobile unit in a digital image that shows at least one partition of the mobile unit, especially in motion, by using a method for machine learning.

It is proposed that the recognition system comprises a categorisation device adapted to perform a categorisation step using the machine learning by categorising the digital image, which shows the—moving—partition of the mobile unit, with a category and a detection device adapted to perform a detection step using the machine learning by determining at least one object of the mobile unit in the categorised digital image and a location of the at least one object in the categorised digital image and/or a segmentation device adapted to perform a segmentation step using the machine learning by classifying positions in the categorised digital image in such that it is determined whether at a respective position of the categorised digital image a part of the at least one object is present or not.

The present invention also refers to computer program comprising instructions which, when the program is executed by a computer, cause the computer to carry out the steps of the recognition method.

The present invention also refers to a computer-readable storage medium comprising instructions which, when executed by a computer, cause the computer to carry out the steps of the recognition method. The invention also refers to a computer-readable data carrier having stored thereon the computer program from above.

Due to these inventive matters the recognition can be performed automatically and thus saving time and man power. Further, by using exclusively a digital image the method is more flexible, less strict on optimal calibration, less prone perspective or lighting in comparison with state of the art systems. Moreover, expensive recognition systems e.g. based on laser technique can be omitted advantageously saving costs. Even if such systems may be employed the recognition method based on the digital image may be used to check and verify the state of the art system.

The inventive approach combines according to one advantageous embodiment the following:
1. Using the appropriate training algorithm; specifically, by using deep convolutional neural networks. These are powerful visual models that yield hierarchies of features from image data.
2. Developing a suitable pipeline to collect appropriate training data with which to train the algorithm to detect objects of the unit, like rolling stock bogie's subcomponents.
3. Developing a suitable synthetic image generator, which takes the collected training data and manually labelled data as "seed", and performs randomized transformations (like image translation, rotation, shearing, lighting filtering, noising filtering, perspective warping) to generate a virtually limitless amount of training data that is somehow realistic, improving the detection accuracy and improving resistance to suboptimal image conditions.
4. Using a combination of categorising, object detection, and segmentation procedures to mimic the tasks done by the engineer performing visual inspection.

The previously given description of advantageous embodiments of the invention contains numerous features which are partially combined with one another in the dependent claims. Expediently, these features can also be considered individually and be combined with one another into further suitable combinations. Furthermore, features of the method, formulated as apparatus features, may be considered as features of the assembly and, accordingly, features of the assembly, formulated as process features, may be considered as features of the method.

The above-described characteristics, features and advantages of the invention and the manner in which they are achieved can be understood more clearly in connection with the following description of exemplary embodiments which will be explained with reference to the drawings. The exemplary embodiments are intended to illustrate the invention, but are not supposed to restrict the scope of the invention to combinations of features given therein, neither with regard to functional features. Furthermore, suitable features of each of the exemplary embodiments can also be explicitly considered in isolation, be removed from one of the exemplary embodiments, be introduced into another of the exemplary embodiments and/or be combined with any of the appended claims.

BRIEF DESCRIPTION OF THE SEVERAL VIEWS OF THE DRAWING

The present invention will be described with reference to drawings in which:

FIG. 2: shows schematically three training data pairs of two different categories, FIG. 5: shows the categorised digital image from FIG. 4 with three differently classified categorised digital images, FIG. 6: shows three raw digital images of the same wheel at three subsequent time points (upper row), the relating classified categorised digital images after segmentation by a human (middle row) and the relating classified categorised digital images after segmentation by the inventive algorithm (bottom row)

DESCRIPTION OF THE INVENTION

Figure 1:
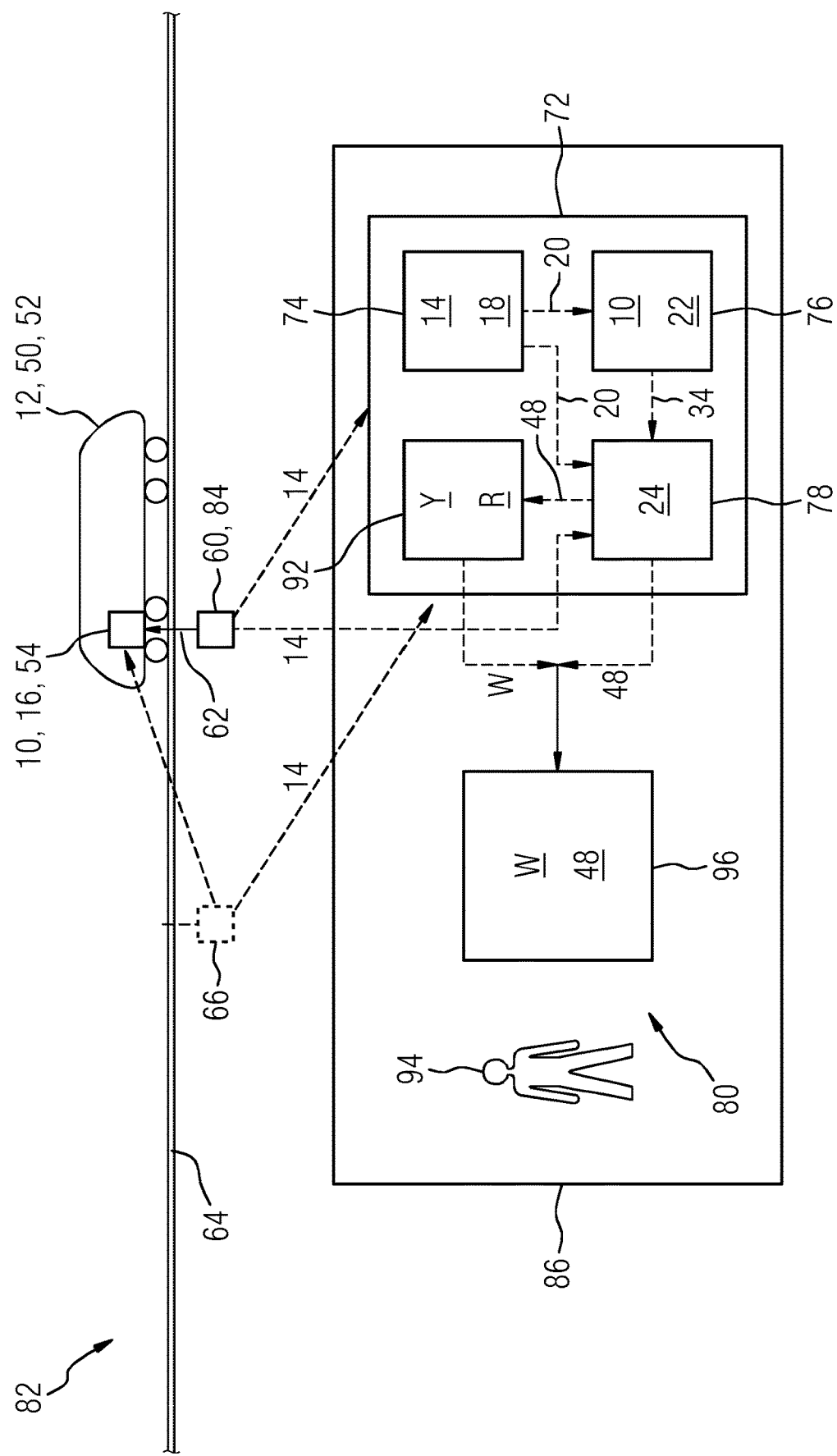
FIG. 1: shows schematically a track with a track-borne camera device and a mobile unit passing the camera device as well as recognition system for validating a digital image taken from the mobile unit.

FIG. 1 shows in a schematically view a pre-determined track 64 of a railway system 82, like, for example, the UK mainline railway. Moreover, FIG. 1 shows a mobile unit 12 embodied as a track-bound vehicle 50, like a train 52 in the form of a high speed train 52, being moveable on the pre-determined track 64. A track-borne device 84 is located at a non-unit-borne location 62 at the track 64 or landside. Further, the track-borne device 84 comprises a high resolution camera 60 to take pictures or a raw digital image 14 of the mobile unit 12 while it passes the high resolution camera 60. The digital image 14 shows a partition 16, like a carriage, a side of the carriage, a bogie or parts thereof) of the mobile unit 12. The railway system 82 further has a control centre 86 that comprises a computer 80 equipped with an appropriate computer program that comprises instructions which, when executed by the computer 80, cause the computer 80 to carry out the steps of the recognition method (details see below). Moreover, the control centre 86 comprises as part of the computer 80 a recognition system 72 for performing a method for recognising at least one object 10, 10' of the mobile unit 12 e.g. a component assembly 30, like a bogie with bogie components 54, like a wheel 56, a brake shoe 58, a brake pad or a spring, in the digital image 14 that shows the partition 16 of the mobile unit 12 in motion. Therefore, the recognition system 72 comprises a categorisation device 74, a detection device 76 and a segmentation device 78 (details see below). All these devices 74, 76, 78 are processing devices.

The camera may be also a part of a mobile device, like a cell phone (not shown). Hence, the recognition method may be executed on the mobile device e.g. the cell phone with at least one camera. Therefore, a computer-readable storage medium that comprises instructions which, when executed by a computer 80, cause the computer 80 to carry out the steps of the recognition method may be used (details see below).

For the recognition a method for machine learning especially supervised learning is used. An appropriate training algorithm may use deep convolutional neural networks.

According to the training method training data would be generated. Therefore, a plurality of training data pairs 68, 70 would be used. In FIG. 2 three training data pairs 68, 70 of two different categories 18 are shown schematically and exemplarily. Each training data pair 68, 70 comprises a training digital image 14, 14', which shows a partition 16 (not shown in the images 14, 14') of the mobile unit 12 in motion, wherein the partition 16 comprises the object 10, 10', for example, a wheel 56 or a brake shoe 58. The digital image 14, 14' of the training data pair 68, 70 may be a real image 14 of the mobile unit 12 in motion, and/or a synthetic digital image derived from CAD-data of the mobile unit (not shown) or a synthetic digital image 14' derived from a transformation operation, like a rotation as shown in FIG. 2, of the real image 14 or a classified categorised digital image 48 (see below) of the mobile unit 12.

Moreover, the training data pair 68, 70 comprises a "label" or an object identifier 32 like a category 18 representing a name ("wheel" or "brake shoe") of the object 10, 10'. It may also be possible to use an assigned or generated classified categorised digital image 48 as a "label". This would be a manual labelling where a human manually generated labels to match each individual training real image. i.e. for a given picture in a segmentation task, a black/white pixel map of the same size of the input image would be created as a label to predict the pixels or non-pixels of a component of interest. Such assigned or generated classified categorised digital images 48 are, for example, shown in FIGS. 6 to 11, middle rows).

Thus, a suitable pipeline to collect appropriate training data with which to train the algorithm to detect objects 10, 10' of the mobile unit 12, like rolling stock bogie's subcomponents, is used.

For the method for recognising the object 10, 10' of the mobile unit 12 in the digital image 14, 14') that shows the partition 16 of the mobile unit 12 in motion, a combination of categorising, object detection, and segmentation procedures are used to mimic the tasks done by the engineer performing visual inspection.

For each task—categorisation, detection and segmentation—the exact configuration of the algorithm of the convolutional neural networks changes.

After the digital image 14 is taken by the camera 60 at the track 64 the image 14 is send to the categorisation device 74 or processor device 74 of the recognition system 72 at the control centre 86.

In a first categorisation step the digital image 14, which shows the partition 16 of the mobile unit 12, is categorised with a category 18. This is shown in FIG. 3, which shows a digital image 14 of bogie components 54 of the mobile unit 12 comprising a wheel 56 and a list 28 of categories 18.

For categorisation (or classification), the neural network considers the entire digital image 14 at once to decide the probability of it belonging to a specific list 28 of known categories 18 or items/components/objects 10, 10', like wheel 56, brake shoe 58, brake pad or spring. Hence, the category 18 that is assignable to the digital image 14 is selected out of a predetermined list 28 of categories 18, wherein the pre-determined list 28 of categories 18 represents objects 10, 10' of a component assembly 30 of the mobile unit 12.

Figure 4:
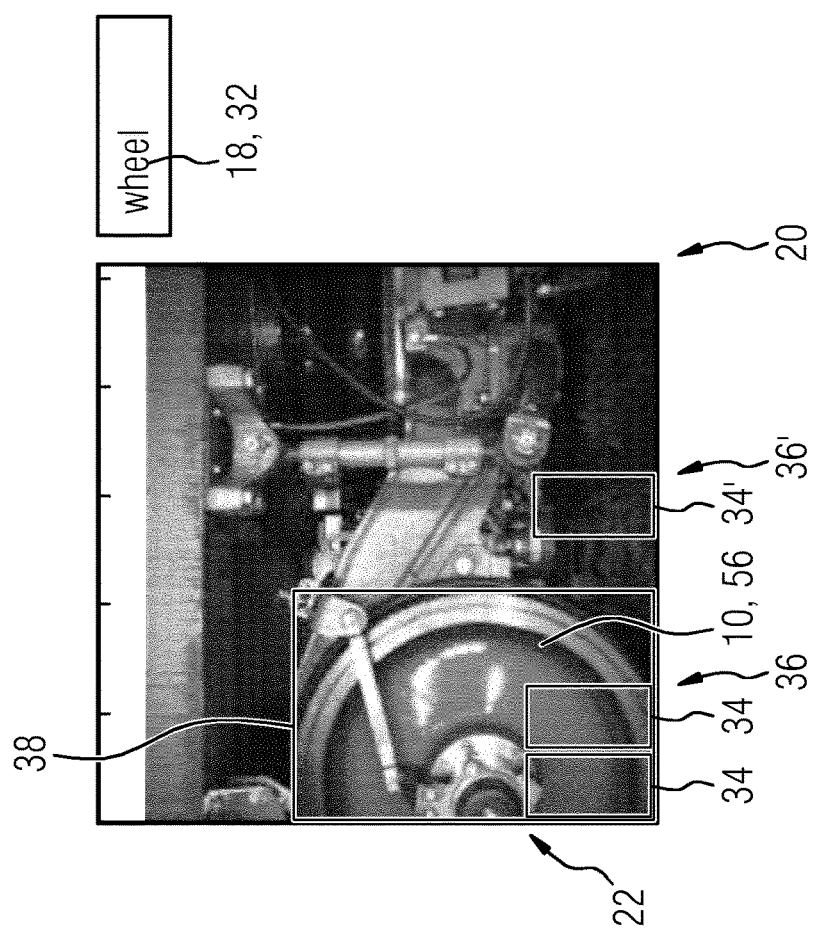
FIG. 4: shows a categorised digital image and schematically sub-images and a bounding box.
Figure 3:
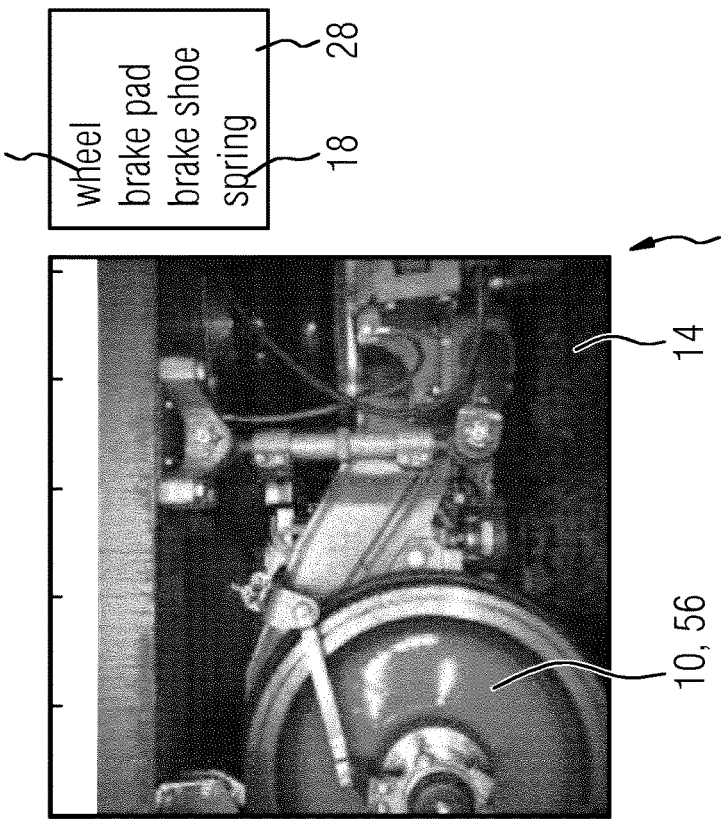
FIG. 3: shows a raw digital image of bogie components of the mobile unit from FIG. 1 and a list of categories.
Figure 7:
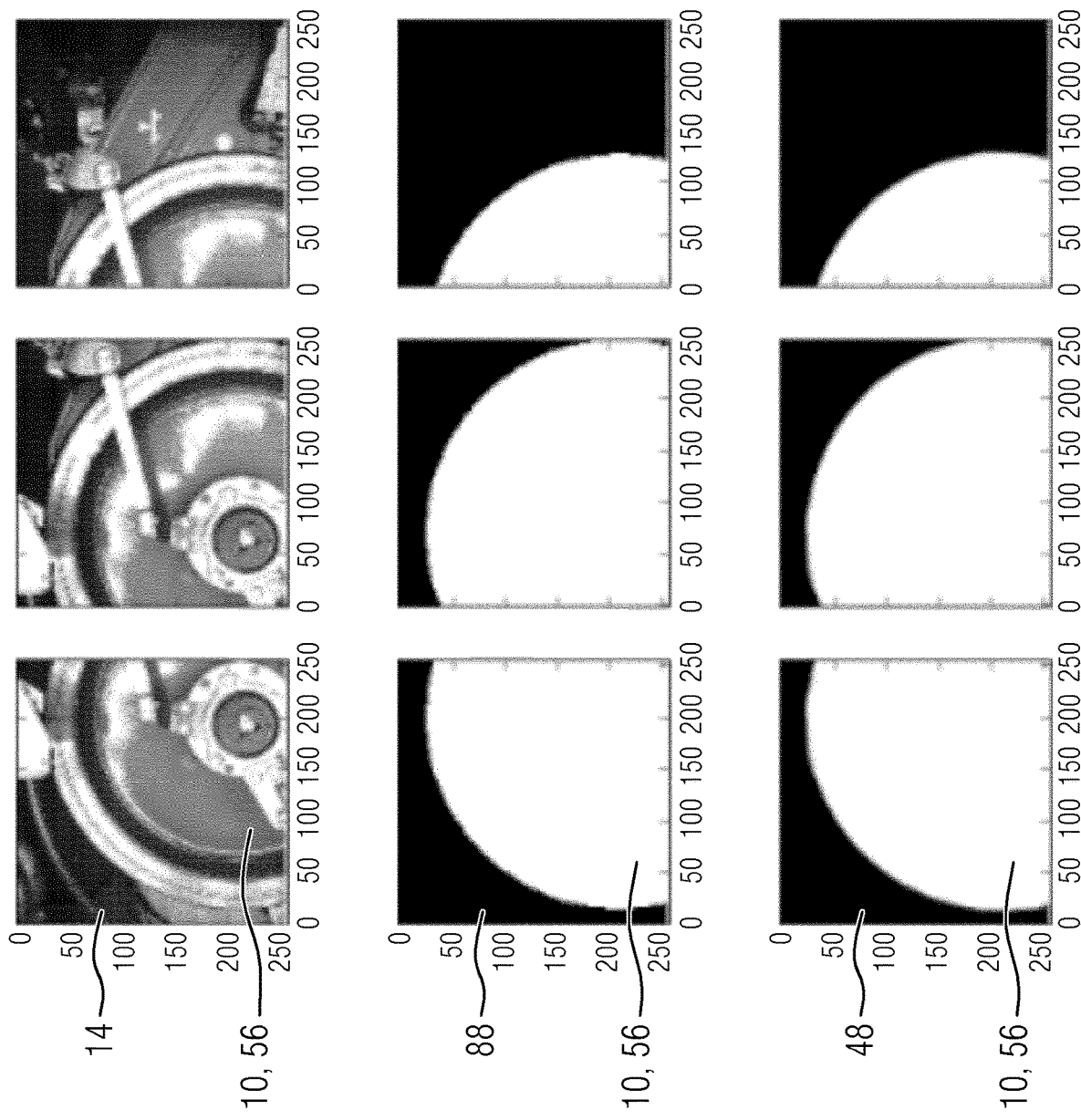
FIG. 7: shows three raw digital images of the wheel from FIG. 6 at three subsequent time points (upper row), the relating classified categorised digital images after segmentation by a human (middle row) and the relating classified categorised digital images after segmentation by the inventive algorithm (bottom row)
Figure 8:
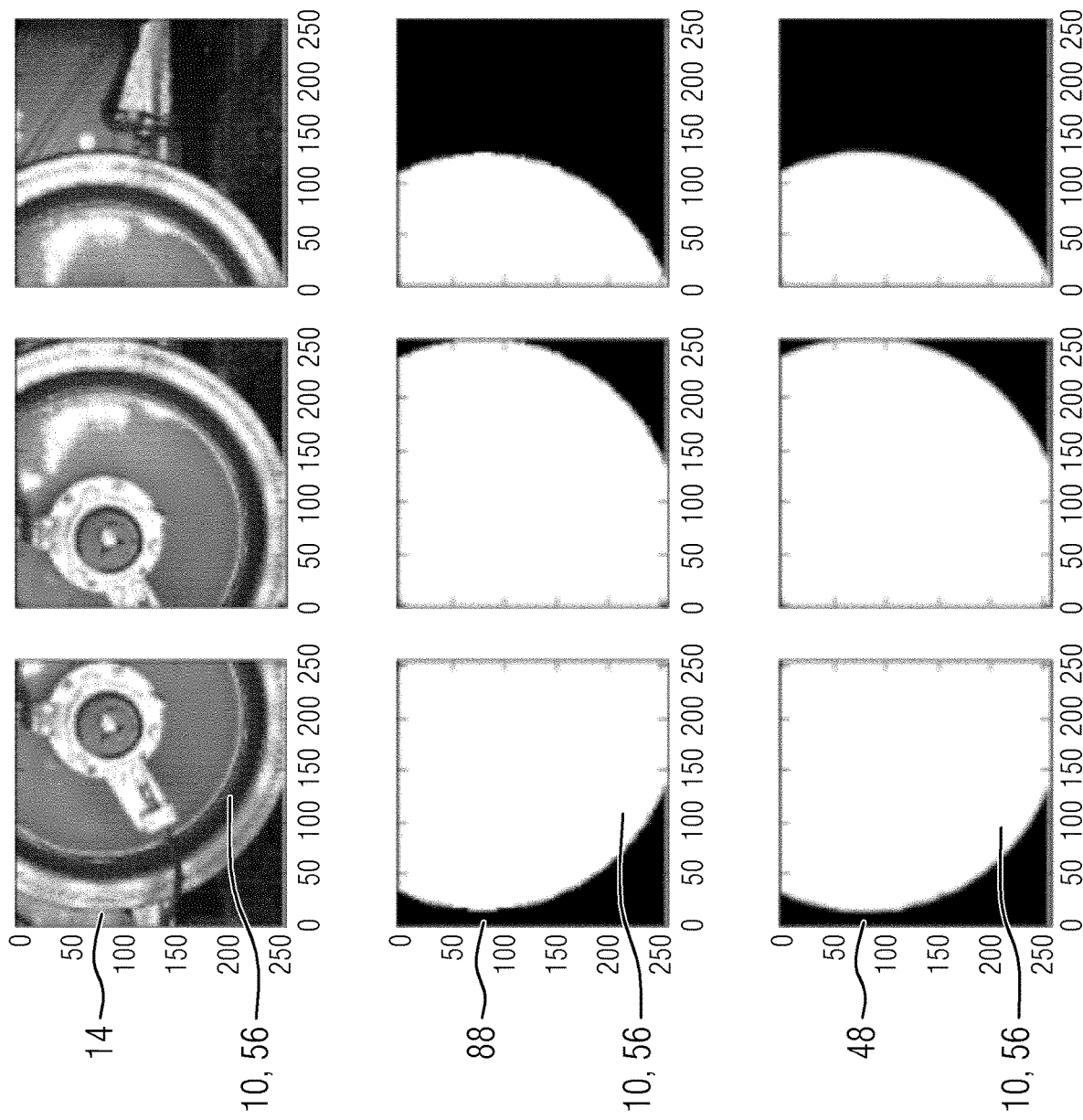
FIG. 8: shows three raw digital images of the wheel from FIG. 6 at three subsequent time points to the time points in FIG. 7 (upper row), the relating classified categorised digital images after segmentation by a human (middle row) and the relating classified categorised digital images after segmentation by the inventive algorithm (bottom row)

Thus, depending on the image or its motive, one object 10 of the mobile unit 12 or several objects 10, 10' is/are identified in the digital image 14 in the categorisation step (only shown for one object 10 in FIGS. 3 and 4). Moreover, a probability of identification to one identified object 10 or to each of the several identified objects 10, 10' is/are assigned. The probability of identification of the identified object 10, 10' will be used to assigning the category 18 to the digital image 14.

In case of an identification of several objects 10, 10' and of an assignment of a probability of identification for each identified object 10, 10' of these several identified objects 10, 10' all assigned probabilities of identification of all identified objects 10, 10' will be used in such that the digital image 14 will get the category 18 of the object 10, 10' will with the highest probability of identification. In other words, the object 10, 10' with the highest probability will be selected. The list could also be concepts like "right or wrong", but they need to be discrete.

Hence, an allocation of the partition 16 in respect to the mobile unit 12 in the categorisation step can be made. For example, the entire image 14 can be categorised or classified in that it belongs to specific location(s) (category) of the unit 12 (train 52). For example, "this image is of a bogie on carriage number 5, left side".

A resulting categorised digital image 20—the digital image 14 of a wheel 56 with the category 18 or label "wheel"—as shown in FIG. 4 will now be processed by the detection device 76 or processor device 76.

Therefore, the object 10 (wheel 56) of the mobile unit 12 in the categorised digital image 20 and a location 22 of the object 10 in the categorised digital image 20 will be determined by using the machine learning in the detection step.

Several sub-images 34, 34' will be selected in the categorised digital image 20, wherein a location 36, 36' of each of the selected sub-images 34, 34' in the categorised digital image 20 is defined. Three exemplary sub-images 34, 34' are shown in FIG. 4 at random locations 36, 36'. For example, the method of a "sliding window" to select the several sub-images 34, 34) in the categorised digital image 20 may be used. In fact, there can be a sliding window with an overlap (where, for example, the step/difference/shift is, to the extreme limit, 1 pixel) and the final result is an average of such overlapping sub-windows (not shown in detail).

The algorithm was trained to search and identify the object 10 by which the digital image 14 was categorised in the categorisation step in each of the several sub-images 34, 34'. In FIG. 4 sub-images 34 show parts of the object 10 or wheel 56 and sub-image 34' not. The location 22 of the object 10 in the categorised digital image 20 can be determined by using the defined locations 36 of the sub-images 34 in which the object 10 was recognised. The identified object 10 in the categorised digital image 20 may be marked, for example, by a pixel location, a dot, a centroid or as shown exemplarily in FIG. 4 as a bounding box 38.

In other words, for object detection, a single or ensemble of neural networks trained on categorisation-type data is used by inputting parts or sub-images 34, 34' of a given image 20. For example, the classifier has a 256×256 pixel vision window (in simple words, it requires an image to be 256×256 pixels size). The image 20 where objects 10, 10' need to be detected in has 2500×2500 pixels size. Therefore, the target image 20 is split into lots of 256×256 pixel sub-tiles or images 34, 34', for example, in a sliding window fashion. Each small window (sub-images 34, 34') is effectively categorised/classified based on the list 28 of categories 18 or labels of interest with an additional label of "Nothing". A "Nothing" label means that the image patch selected has none of the predefined categories 18 or classes. If, for example, objects 10, 10', like a wheel 56 or a brake pad 58, are detected and a location 36' or patch with neither is analysed a different label i.e. background or "Nothing" is needed.

What is returned is a probability map (not shown), and whether at a specific location 36, 36' the probability for a specific category 18 (or class) if very high, the algorithm will claim that at this approximate location 36, 36' it is likely object 10, 10' to be present. Visually this can be represented by a bounding box 38 or a dot.

Hence, in the detection step the presence of object(s) 10, 10' or component(s) within a single sub-image 34 is detected, giving an approximate pixel location 36 or centroid/bounding box 38. For example, "In this image, there is a fan in the top left corner and a brake pad in the bottom right."

Furthermore, in a segmentation step positions 24 in the categorised digital image 20 are classified by using the machine learning in such that it is determined whether at a respective position 24 of the categorised digital image 20 a part 26 of the object 10 is present or not. This is depicted in FIG. 5 that shows on the left the categorised digital image 20 (also feasible with the raw digital image 14) with three differently classified categorised digital images 48, 88, 90. In general, it would be also possible to classify positions of all sub-images 34, 34' in which the object 10 was identified (not shown).

Therefore, a parameter 40, 42 is assigned to each pixel 44, 46 of the categorised digital image 20, wherein the parameter 40, 42 specifies if a respective pixel 44, 46 represents a part 26 of the identified object 10 or not. In this exemplary embodiment the parameter 40 is the colour white and parameter 42 is the colour black. Thus, a classified categorised digital image 48, 88, 90 as a black and white pixel map is created. The second image 88 to the left in FIG. 5 shows the Ground truth—the result of a segmentation done by a human, so to speak the reference to qualify the performance of the algorithm—the second image to the right in FIG. 5 shows the result from the algorithm and the image 90 to the right in FIG. 5 shows the result of an erroneous segmentation.

The comparison of the results from the segmentation done by a human (images 88 in FIG. 5) and from the segmentation done by the algorithm (image 48 in FIG. 5) shows that the algorithm obtains similar results as the segmentation done by a human. Thus, the algorithm works good and satisfactory.

Figure 9:
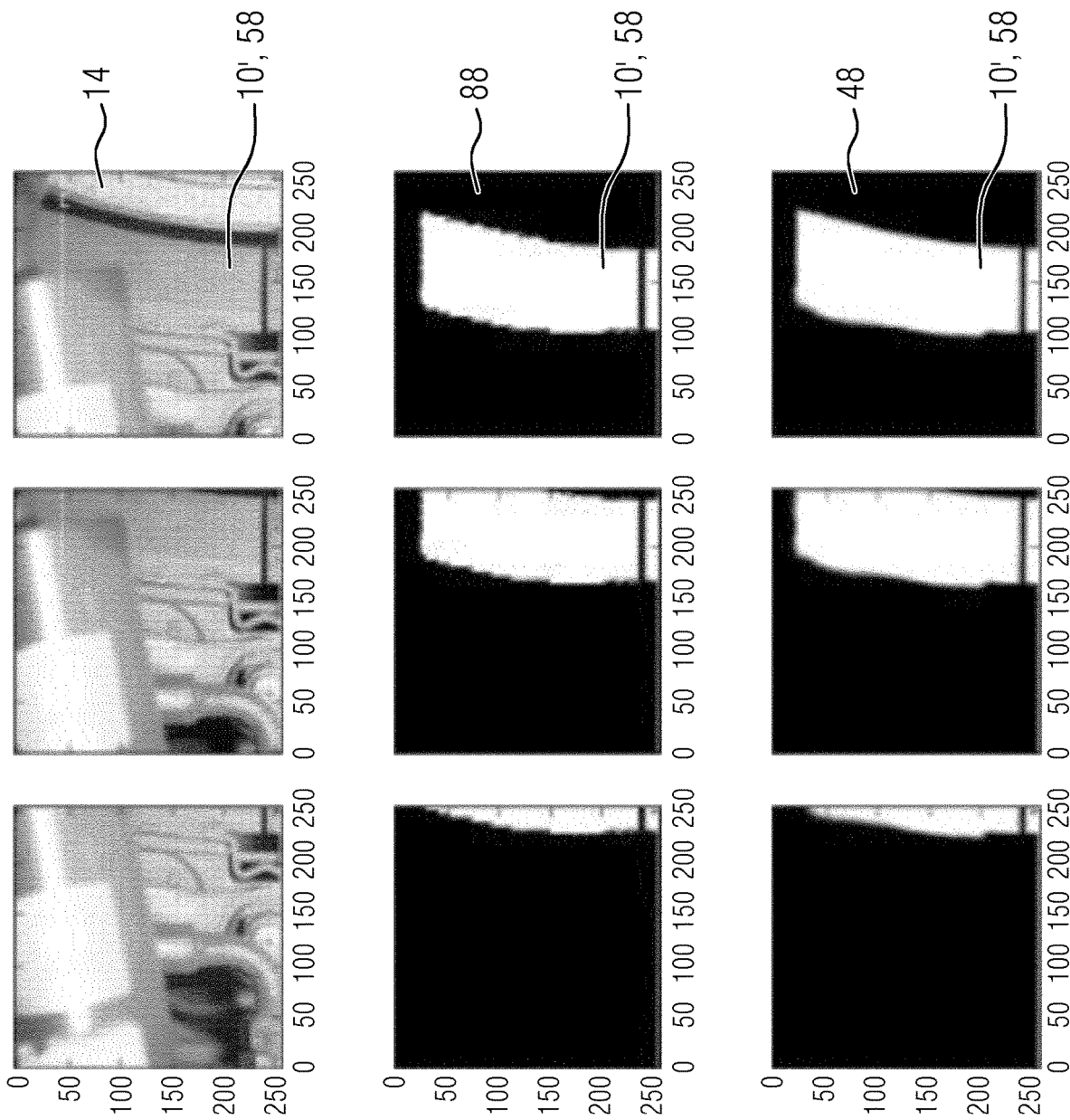
FIG. 9: shows three raw digital images of the same brake shoe at three subsequent time points (upper row), the relating classified categorised digital images after segmentation by a human (middle row) and the relating classified categorised digital images after segmentation by the inventive algorithm (bottom row)
Figure 10:
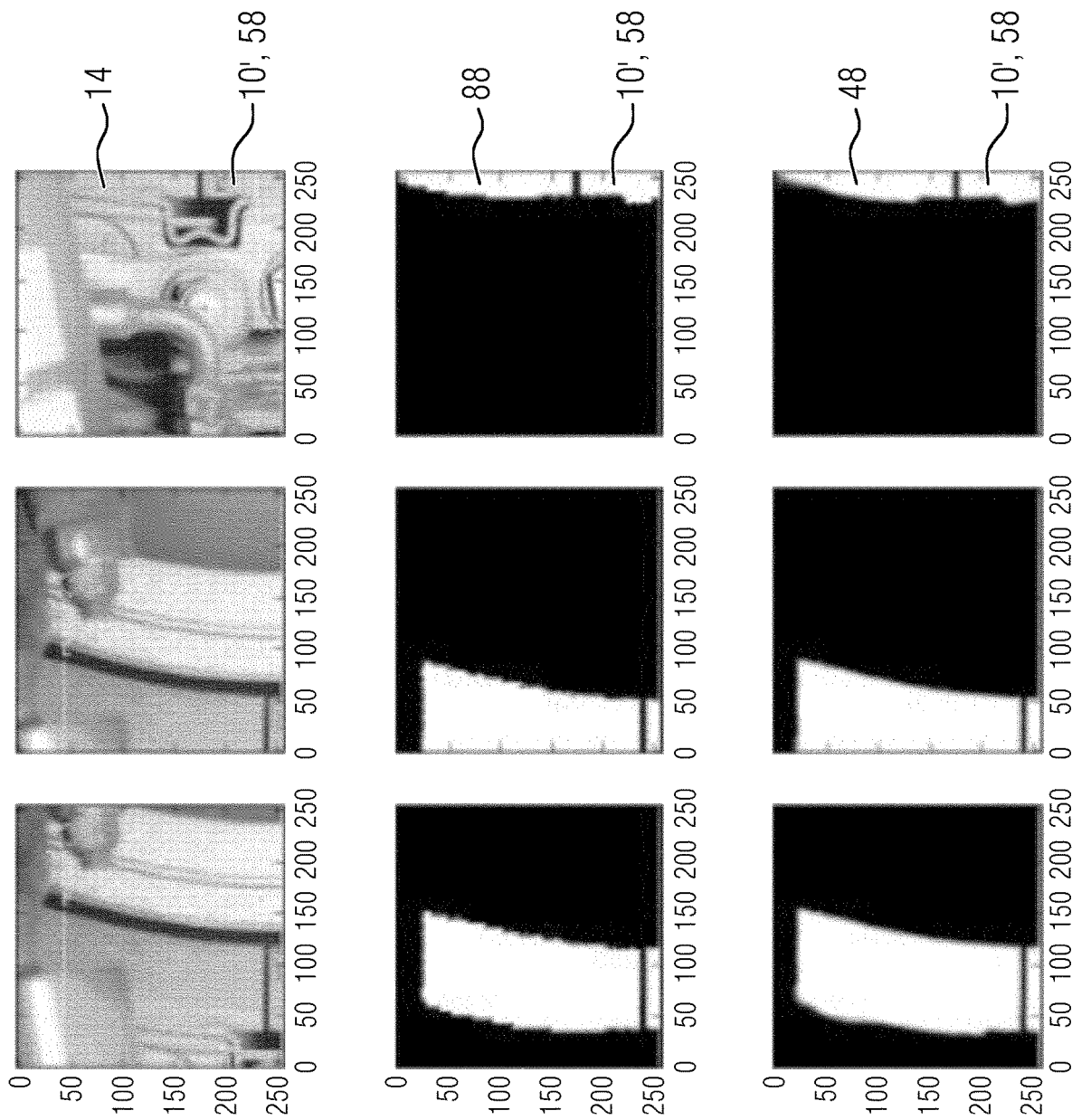
FIG. 10: shows three raw digital images of the brake shoe from FIG. 9 at three subsequent time points (upper row), the relating classified categorised digital images after segmentation by a human (middle row) and the relating classified categorised digital images after segmentation by the inventive algorithm (bottom row)
Figure 11:
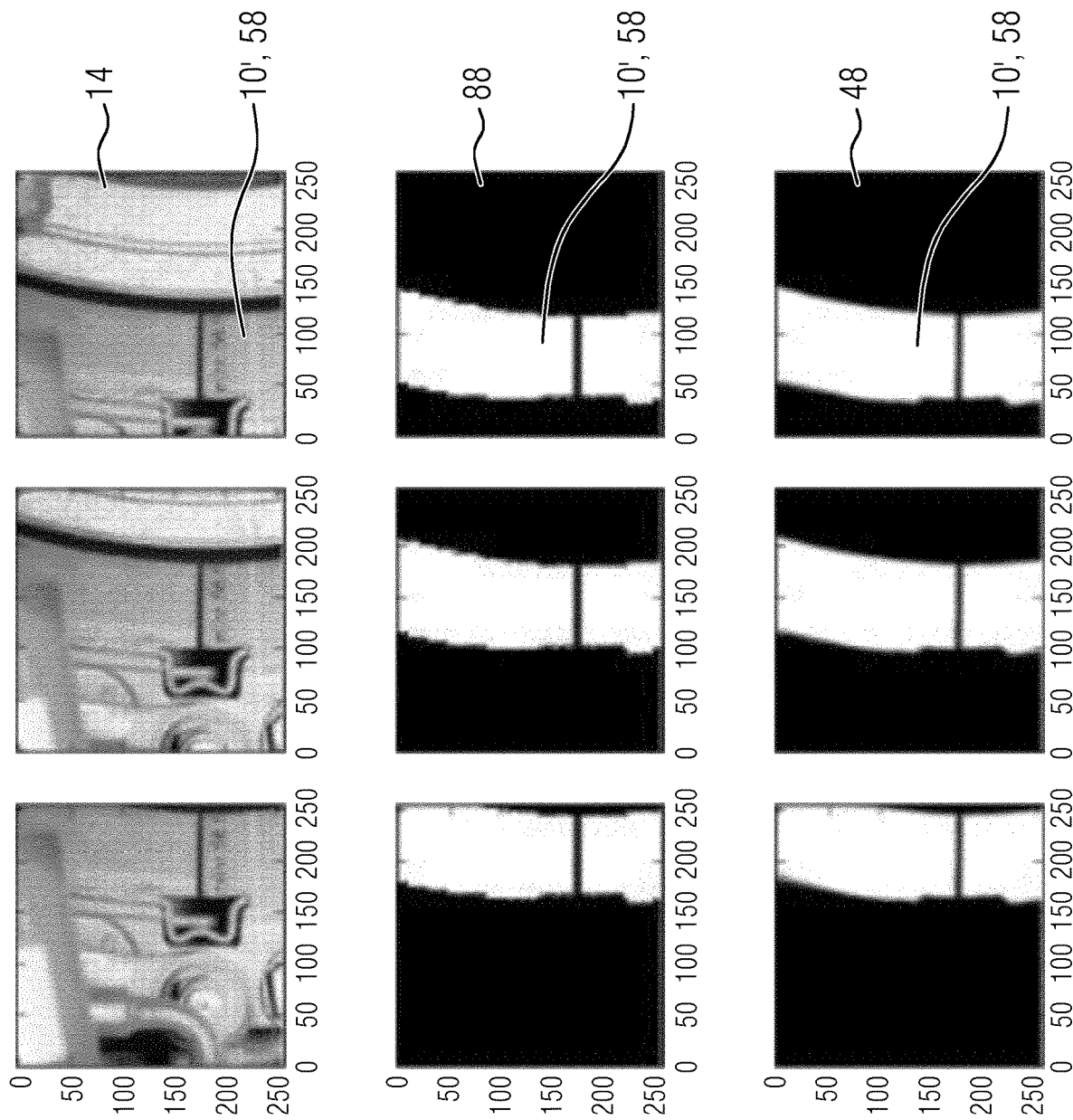
FIG. 11: shows three raw digital images of the brake shoe from FIG. 9 at three subsequent time points to the time points in FIG. 10 (upper row), the relating classified categorised digital images after segmentation by a human (middle row) and the relating classified categorised digital images after segmentation by the inventive algorithm (bottom row)

Two other segmentation results, which confirm the good performance of the algorithm, are shown in FIGS. 6 to 11 for chronologically taken images 14 from two objects 10, 10', namely a wheel 56 and a brake shoe 58, wherein FIGS. 6 to 9 show the images 14, 48, 88 and results for a wheel 56 and FIGS. 9 to 11 for a brake shoe 58 (top row: raw images, middle row: segmentation done by a human, bottom row: segmentation done by the algorithm, reference numerals are only shown for one column of images per FIG).

In other words, for segmentation, that is a pixel-by-pixel prediction, a "fully convolutional network" may be used (for example: "Fully Convolutional Networks for Semantic Segmentation", Jonathan Long, Evan Shelhamer, Trevor Darrell, UC Berkeley). These networks take an arbitrarily sized input image and produce a correspondingly-sized output with a pixel-by-pixel prediction. The fully convolutional network, in case of need, may also be incorporated into a conditional random field recurrent neural network (CRF RNN), which may improve prediction accuracy (for example: "Conditional Random Fields as Recurrent Neural Networks", Shuai Zheng, Sadeep Jayasumana, Bernardino Romera-Paredes, Vibhav Vineet, Zhizhong Su, Dalong Du, Chang Huang, Philip H. S. Torr., Torr Vision Group, University of Oxford, Stanford University, Baidu IDL).

Segmentation capabilities, meaning doing pixel-by-pixel predictions of whether each pixel 44, 46 belongs to a particular object 10, 10' or component, allowing measurements to be performed. For example, "given this image, the model has produced a binary mask where all the "0" pixels do not belong to a wheel, and the "1" pixels belong to a wheel".

Figure 12:
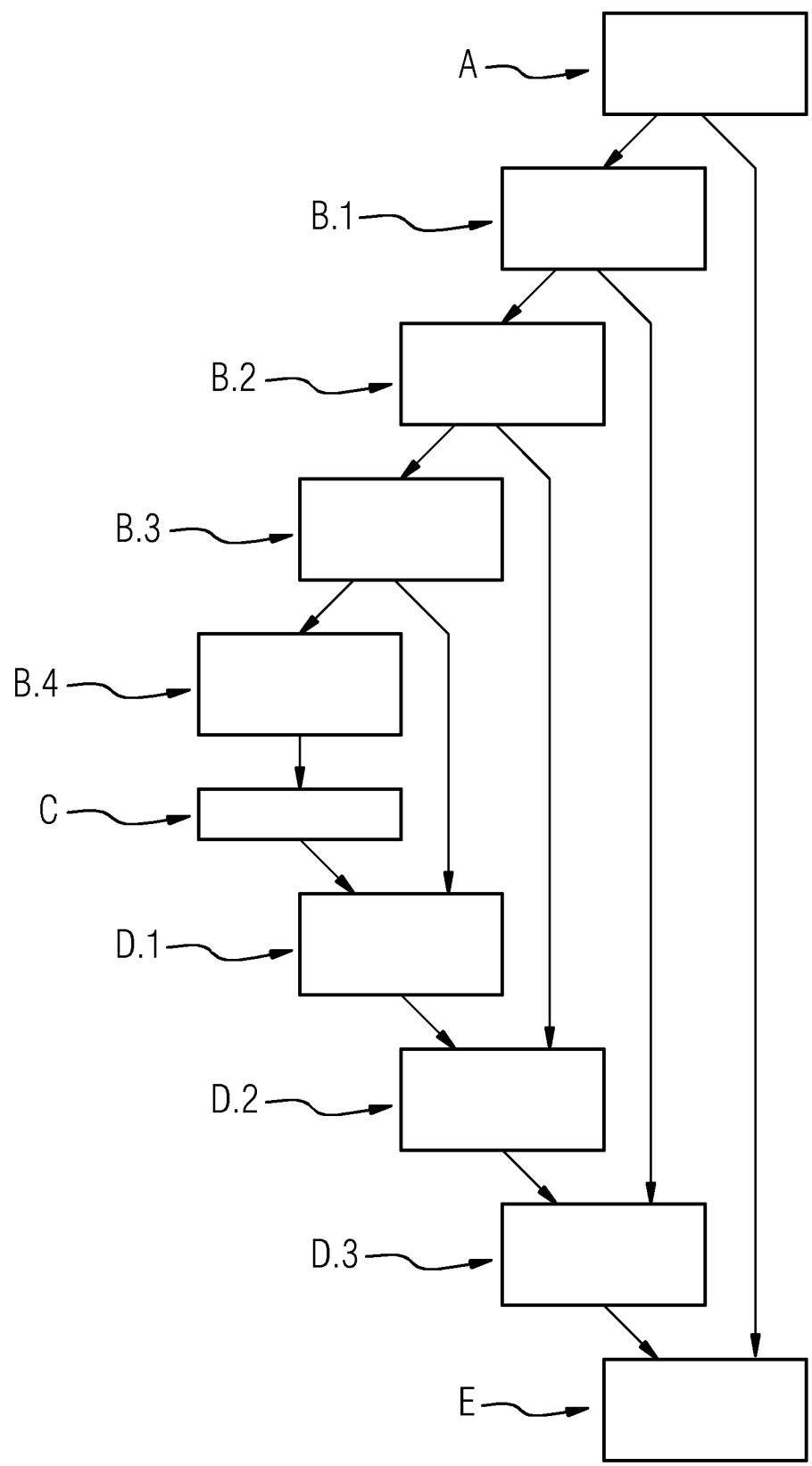
FIG. 12: shows schematically the structure of a neutral network used in a segmentation step of the inventive method.

In FIG. 12 a structure of an exemplary convolutional neural network for the segmentation step is shown, wherein FIGS. 13 to 17 show the sub-steps in more detail.

Figure 13:
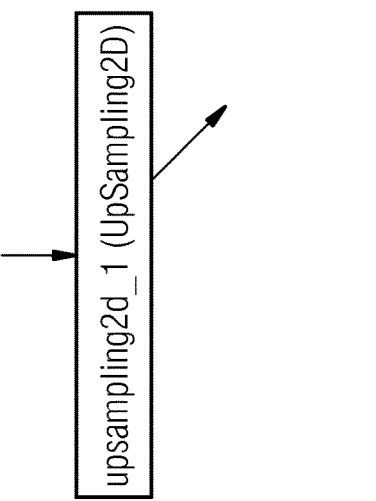
FIG. 13: shows the first three steps of the neutral network from FIG. 12, FIG. 14: shows a set of four steps being performed several times after the steps from FIG. 13, FIG. 15: shows an Up Sampling step being performed after the last set of steps from FIG. 14, FIG. 16: shows a set of four steps being performed several times after the step from FIG. 15, FIG. 17: shows the last four steps being after the last set of steps from FIG. 16 and FIG. 18: shows a block-diagram of an operation strategy according to the inventive recognition method in combination with an alternative recognition method.

The network starts with a set A comprising three steps (see FIG. 13). An input_1 (input layer) is convoluted in two subsequent Convolution steps Convolution2D (convolution2d_1 and convolution2d_2). The input layer is simply accepting an image, like digital image 14 or categorised digital image 20. The image is a 3-D tensor of numbers between, where the dimensions are width, height and channel (RGB).

Convolution2D: These steps have a convolution operator for filtering windows of two-dimensional inputs.

The main arguments are:
nb filter: Number of convolution filters to use.
nb_row: Number of rows in the convolution kernel.
nb_col: Number of columns in the convolution kernel.
The input shape is: 4D tensor with shape: (samples, channels, rows, cols)
The output shape is: 4D tensor with shape: (samples, nb filter, new rows, new cols)

Figure 14:
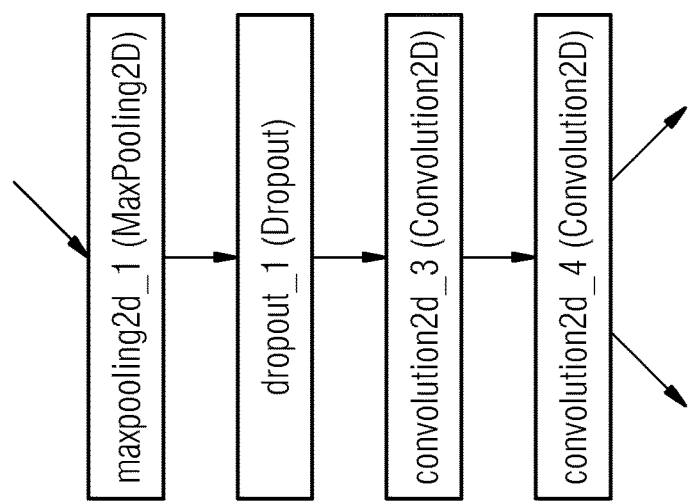

After the set of steps A a set of steps B are performed four times (B.1, B.2, B.3, B.4) (see FIG. 14). In detail: Each set B comprises the subsequent steps of: Maxpooling2D, Drop-out and two steps of Convolution2D. Thus, in all sets B we have the steps: maxpooling2d_1 to maxpooling2d_4, dropout 1 to dropout 4 and convolution2d_3 to convolution2d_10.

Max Pooling: These steps have a Max pooling operation for spatial data.

The arguments are:
pool size: tuple of 2 integers, factors by which to downscale (vertical, horizontal). (2, 2) will halve the image in each dimension.
strides: tuple of 2 integers. or None. Strides values If None. it will default to pool size.
The input shape is: 4D tensor with shape: (samples, channels, rows, cols).
The output shape is: 4D tensor with shape: (nb samples, chanels, pooled_rows, pooled_cols)

Dropout: This step applies dropout to the input tensor. Drop-out consists in randomly setting a fraction p of input units to 0 at each update during training time, which helps prevent overfitting.

The arguments are:
p: float between 0 and 1. Fraction of the input units to drop.

(For reference see: Dropout: "A Simple Way to Prevent Neural Networks from Overfitting" Nitish Srivastava et al., Journal of Machine Learning Research 15 (2014) 1929-1958)

Figure 15:
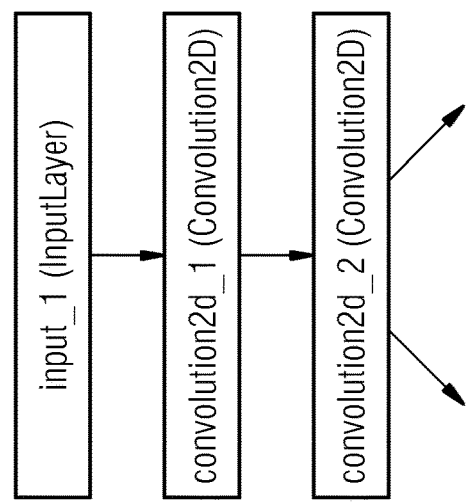

After the set of steps B a step C of UpSampling2D (upsampling2d_1) follows (see FIG. 15).

In the Up Sampling step is the reverse process of Max Pooling is performed. For example, if a vector 101 is used and is upsampled by a factor of two, it will be 110011. Basically, each unit by the upsampling factor is repeated.

Figure 16:
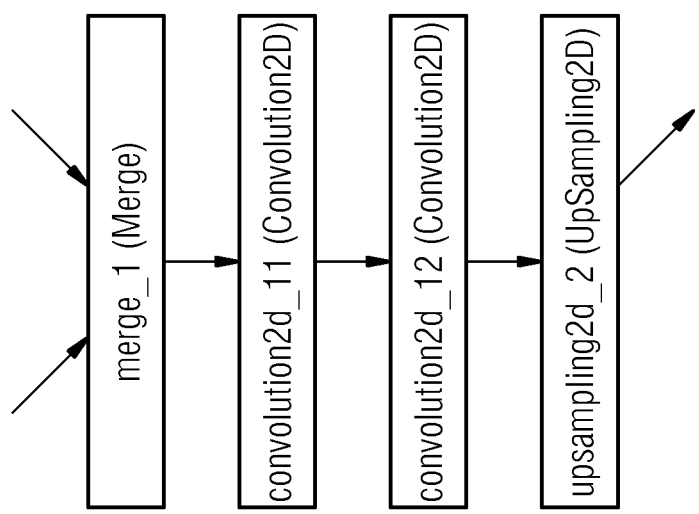

Thereafter, three sets of steps D (D.1, D.2, D.3) are performed (see FIG. 16). Each set D start with a step Merge (merge_1 to merge_3) where the upsampled data from the beforehand set is merged with data from the last Convolution2D step from one of the set B (see FIG. 12).

Merge operations are simply concatenating two or more tensors in a given dimension, provided they are the same in all other dimensions. I.e. when having a 5×3 and a 9×3 tensor, and by merging them along the 1ˆst dimension, resulting in a 14×3 tensor.

After the Merge step follow two subsequent Convolution2D steps (convolution2d_11 to convolution2d_16) and a further step of UpSampling2D (upsampling2d_2 to upsampling2d_4).

Hence, in set D.1 (step merge_1) the data from step UpSampling2D (upsampling2d_1) from step C are merged with the data from second step Convolution2D of set B.3 (concolution2d_8). In set D.2 (step merge_2) the data from step UpSampling2D (upsampling2d_2) from step D.1 are merged with the data from second step Convolution2D of set B.2 (concolution2d_6). In set D.3 (step merge_3) the data from step UpSampling2D (upsampling2d_3) from step D.2 are merged with the data from second step Convolution2D of set B.1 (concolution2d_4).

Figure 17:
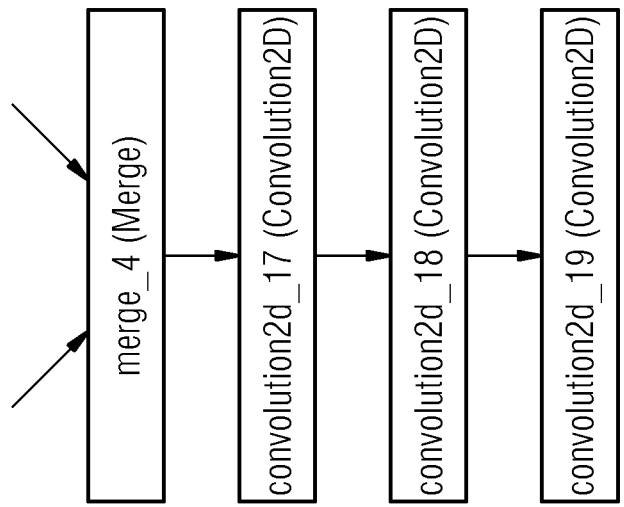

Following set D3 is set of steps E (see FIG. 17). Set E comprises a merge step and three subsequent Convolution steps. Hence, in set E (step merge 4) the data from step UpSampling2D (upsampling2d_4) from step D.3 are merged with the data from second step Convolution2D of set A (concolution2d_2). Thereafter follow three steps of Convolution2D (convolution2d_17 to convolution2d_19).

The output of the set of steps E is i.e. a bitmap referring to "yes/no" of each pixel 44, 46 belonging to a category 18 or a class. Or, as described above, the output is a classified categorised digital image 48, for example, as a black and white pixel map (see pictures with reference numeral 48 in FIGS. 5 to 11).

The identified object 10, 10' or its properties may now be further evaluated, for example, in an evaluation device 92 of the recognition system 72. Thus, a visual description property of the identified object 10, 10' may be determined by using the classified categorised digital image 48. Such a visual description property may be a contour, shape, shape or colour of the object 10, 10'. For evaluation the determined visual description property of the identified object 10, 10' may be compared with a predetermined reference visual description property R referring to the respective visual description property. Such references R may be stored in the evaluation device 92, the recognition system 72 or elsewhere in the computer 80.

If a predetermined condition is fulfilled or not fulfilled as a result of the comparison at least one abnormality Y may be detected. Hence a warning W may be issued to an operator 94 e.g. in a display 96. It may also be an acoustic warning. The classified categorised digital image 48 e.g. black and white pixel map may also be issued to the operator 94 in the display 96 for their surveillance.

Thus, the recognition method can be used for an automatic visual inspection of the mobile unit 12, especially for at least one object 10, 10' of the track-bound vehicle 50, especially a train 52, wherein the at least one object 10, 10' of the mobile unit 12 is identified in the digital image 14, 14' during the automatic visual inspection.

Moreover, the recognition method can be used for a recognition of an abnormality Y in respect to the identified object 10, 10', wherein the identified object 10, 10' is evaluated by using the categorised digital image 20 or the classified categorised digital image 48 in such that it is determined if the respective image 20, 48 complies or not complies with at least one predefined criterion.

Furthermore, the recognition method can be used for checking, and especially for verifying, a result of an alternative method for recognising at least one object 10, 10' of the mobile unit 12, especially in motion, especially by using an optical measurement system 66, wherein both methods are executed on the same object 10, 10'.

Such a measurement system 60 may be a state of the art laser measurement system 16. Since these systems take pictures routinely, those pictures can be used as digital images 14 to perform the inventive recognition method.

Figure 18:
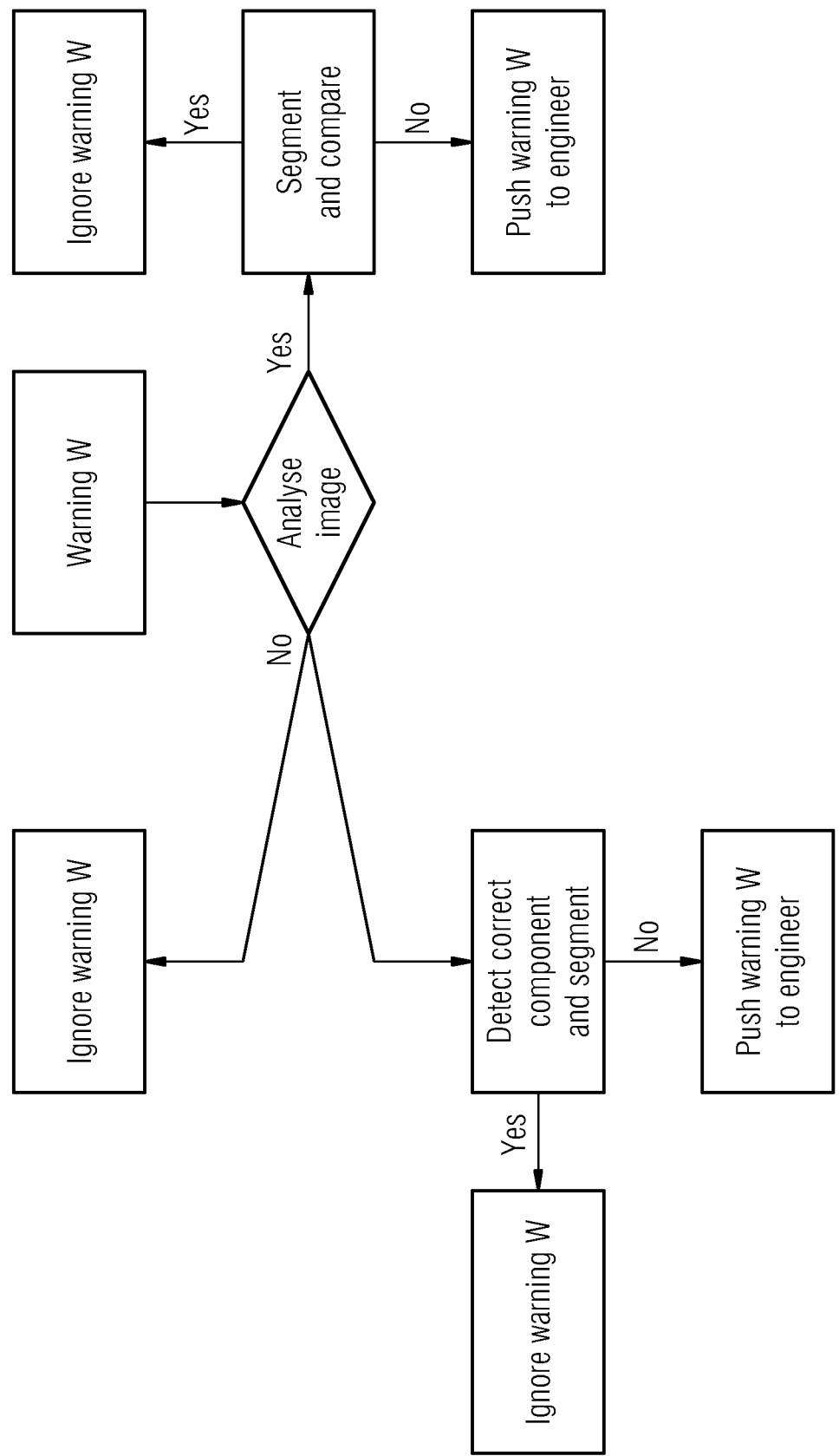

To shorten processing time the checking, and especially the verifying, is solely performed in case at least one of the methods detects an abnormality Y. Hence, these specific algorithms can be used within an integrated pipeline for rolling stock visual inspection, by using data collected and labelled accordingly. An exemplary pipeline is shown in the block diagram of FIG. 18 and is summarized in the following way:

If the laser measurement system 66 yields a warning W the image 14 associated to the warning W will be analysed.

If the image 14 is the correct image 14 in terms of location 22 of the object 10, 10' (option "Yes") the object of interest 10, 10' is segmented and compared to the measurement of the laser measurement system 66. If the obtained segmentation result is highly different from the measurement of the laser measurement system 66 (option "Yes") ignore warning W. If the result and the measurement are similar (option "No"), push warning W to the operator 96 e.g. an engineer for work order.

If the image 14 is not the correct image 14 in terms of location 22 of the object 10, 10' (option "No") either ignore the measurement of the laser system 66 or the warning W or if desired, detect the correct object (An object belonging to the same category 18 as the "expected" object 10, 10') within image frames and segment the object. If segmentation is within bounds (option "Yes"), ignore warning W. If segmentation is out of bounds (option "No"), push warning to engineer for work order. Since the image evaluated shows not the expected object 10, 10' but rather another object belonging to the same category 18, for example, not a wheel from carriage 5 but a wheel from carriage 6, the warning W would result in a notification of an abnormality Y in respect to the wheel of carriage 6.

This pipeline shows that the invention yields a method and system 72 that does not necessarily seek to fully replace the current system 66 based on lasers. Thus, the advantages of both systems 66, 72 can be used—the high accuracy of the laser system 66 and the more robust recognition system 72 based on digital images 14. However, the recognition system 66 aims to provide an automatic visual inspection system which functions in cases where the laser system 66 fails.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

Although the invention is illustrated and described in detail by the preferred embodiments, the invention is not limited by the examples disclosed, and other variations can be derived therefrom by a person skilled in the art without departing from the scope of the invention.

The invention claimed is:

1. A method for recognizing at least one object of a mobile unit in a digital image showing at least one partition of the mobile unit, by using a method for machine learning, which comprises the following steps of:
    categorizing, by using the machine learning in a categorization step, the digital image that shows the partition of the mobile unit, with a category, the category being assigned to the digital image out of a predetermined list of categories, wherein the predetermined list of categories represents objects of a component assembly of the mobile unit;
    allocating, in the categorization step, an allocation of the partition of the mobile unit, which is shown in the digital image, in respect to the mobile unit;
    identifying, in the categorization step, the at least one object of the mobile unit in the digital image, and assigning a probability of identification to at least one identified object;
    performing a categorization, in the categorization step, in case of an identification of several objects and of an assignment of the probability of identification for each identified object of several identified objects by using all assigned probabilities of identification of all the identified objects; and
    assigning, in the categorization step, the category to the digital image, wherein the category refers to the identified object with a highest probability of identification;
    determining, by using the machine learning in a detection step, the at least one object of the mobile unit in a categorized digital image and a location of the at least one object in the categorized digital image; and/or
    classifying, by using the machine learning in a segmentation step, positions in the categorized digital image such that it is determined whether at a respective position of the categorized digital image a part of the at least one object is present or not.

2. The method according to claim 1, which further comprises performing the categorization step by assigning the category to the digital image by using the probability of identification of the at least one identified object.

3. The method according to claim 1, wherein the category that is assignable to the digital image is an object identifier of the object of the mobile unit.

4. The method according to claim 1, which further comprises selecting in the detection step several sub-images in the categorized digital image, wherein a location of each selected sub-images in the categorized digital image is defined.

5. The method according to claim 4, which further comprises using in the detection step a method of a sliding window to select the several sub-images in the categorized digital image.

6. The method according to claim 4, which further comprises searching and/or identifying in the detection step in each of the several sub-images the object by which the digital image was categorized in the categorization step.

7. The method according to claim 4, which further comprises determining in the detection step the location of the object in the categorized digital image by using defined locations of the sub-images in which the object was recognized.

8. The method according to claim 1, which further comprises marking an identified object in the categorized digital image.

9. The method according to claim 1, which further comprises assigning in the segmentation step at least one parameter to each pixel of the categorized digital image, wherein the parameter specifies if a respective pixel represents a part of the identified object or not.

10. The method according to claim 1, which further comprises determining at least one visual description property of an identified object by using a classified categorized digital image.

11. The method according to claim 10, which further comprises comparing a determined visual description property of the identified object with at least one predetermined reference visual description property.

12. The method according to claim 11, which further comprises:
detecting at least one abnormality if a predetermined condition is fulfilled or not fulfilled as a result of a comparison; and/or
issuing at least one warning if the predetermined condition is fulfilled or not fulfilled as a result of the comparison.

13. The method according to claim 1, wherein the mobile unit is a track-bound vehicle.

14. The method according to claim 1, wherein the object is a bogie component.

15. The method according to claim 1, wherein the machine learning is a method selected from the group consisting of: supervised learning, semi-supervised learning, unsupervised learning, reinforcement learning and active learning.

16. The method according to claim 1, wherein the digital image is an image taken from a high resolution camera positioned at a non-unit-borne location, while the mobile unit passes the high resolution camera.

17. The method according to claim 1, wherein the method is executed on a mobile device.

18. The method according to claim 1, wherein the method is used for an automatic visual inspection of the mobile unit, and the at least one object of the mobile unit is identified in the digital image during the automatic visual inspection.

19. The method according to claim 1, wherein the method is used for a recognition of an abnormality in respect to an identified object wherein the identified object is evaluated by using the categorized digital image or a classified categorized digital image in such a way that it is determined if a respective image complies or not complies with at least one predefined criterion.

20. The method according to claim 1, wherein the method is used for checking a result of an alternative method for recognizing the at least one object of the mobile unit, wherein both the method and the alternative method are executed on a same object.

21. The method according to claim 20, wherein the checking is solely performed in case at least one of the method or the alternative method detects an abnormality.

22. The method according to claim 1, wherein the machine learning is trained according to a method for training, the method for training comprises at least the following steps of:
generating training data that contain a plurality of training data pairs, wherein each of the training data pairs contains a training digital image which shows the at least one partition of the mobile unit; and
an assigned category; and/or
an assigned object; and/or
an assigned location of an identified object; and/or
an assigned classified categorized digital image; and
training the method for machine learning by using the training data, wherein at least one parameter of the method for machine learning is adapted.

23. The method according to claim 22, wherein the digital image of the training data pair is:
a real image of the mobile unit; and/or
a synthetic digital image derived from CAD-data of the mobile unit; and/or
a synthetic digital image derived from a transformation operation of the real image of the mobile unit.

24. The method according to claim 23, wherein the transformation operation is an operation selected from the group consisting of: translation, rotation, shearing, filtering, lighting filtering, noising filtering, perspective warping, color change, change in color balance, change in contrast, and change in lighting.

25. A recognition system for recognizing at least one object of a mobile unit in a digital image showing at least one partition of the mobile unit, by using a method for machine learning, the recognition system comprising:
a categorization device adapted to perform a categorization step using the machine learning by categorizing the digital image that shows the partition of the mobile unit, with a category, the category being assigned to the digital image out of a predetermined list of categories, wherein the predetermined list of categories represents objects of a component assembly of the mobile unit;
the categorization device configured to:
allocate, in the categorization step, an allocation of the partition of the mobile unit, which is shown in the digital image, in respect to the mobile unit;
identify, in the categorization step, the at least one object of the mobile unit in the digital image, and assigning a probability of identification to at least one identified object;
perform a categorization, in the categorization step, in case of an identification of several objects and of an assignment of the probability of identification for each identified object of several identified objects by using all assigned probabilities of identification of all the identified objects; and
assign, in the categorization step, the category to the digital image, wherein the category refers to the identified object with a highest probability of identification;
a detection device adapted to perform a detection step using the machine learning by determining the at least one object of the mobile unit in a categorized digital image and a location of the at least one object in the categorized digital image; and/or
a segmentation device adapted to perform a segmentation step using the machine learning by classifying positions in the categorized digital image in such a way that it is determined whether at a respective position of the categorized digital image a part of the at least one object is present or not.

26. A non-transitory computer-readable storage medium having computer executable instructions, which when executed by a computer, cause the computer to carry out a method for recognizing at least one object of a mobile unit in a digital image that shows at least one partition of the mobile unit, by using a method for machine learning, the method comprises the following steps of:

categorizing, by using the machine learning in a categorization step, the digital image that shows the partition of the mobile unit, with a category, the category being assigned to the digital image out of a predetermined list of categories, wherein the predetermined list of categories represents objects of a component assembly of the mobile unit;

allocating, in the categorization step, an allocation of the partition of the mobile unit, which is shown in the digital image, in respect to the mobile unit;

identifying, in the categorization step, the at least one object of the mobile unit in the digital image, and assigning a probability of identification to at least one identified object;

performing a categorization, in the categorization step, in case of an identification of several objects and of an assignment of the probability of identification for each identified object of several identified objects by using all assigned probabilities of identification of all the identified objects; and assigning, in the categorization step, the category to the digital image, wherein the category refers to the identified object with a highest probability of identification;

determining, by using the machine learning in a detection step, the at least one object of the mobile unit in a categorized digital image and a location of the at least one object in the categorized digital image; and/or classifying, by using the machine learning in a segmentation step, positions in the categorized digital image such that it is determined whether at a respective position of the categorized digital image a part of the at least one object is present or not.

* * * * *